(12) United States Patent
Visco et al.

(10) Patent No.: US 8,652,692 B2
(45) Date of Patent: Feb. 18, 2014

(54) LI/AIR NON-AQUEOUS BATTERIES

(75) Inventors: Steven J. Visco, Berkeley, CA (US);
Yevgeniy S. Nimon, Danville, CA (US);
Bruce Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 1590 days.

(21) Appl. No.: 11/562,883

(22) Filed: Nov. 22, 2006

(65) Prior Publication Data
US 2007/0117007 A1    May 24, 2007

Related U.S. Application Data

(60) Provisional application No. 60/739,224, filed on Nov. 23, 2005.

(51) Int. Cl.
*H01M 2/16* (2006.01)
*H01M 2/18* (2006.01)
*H01M 4/13* (2010.01)
*H01M 4/58* (2010.01)
*H01M 8/22* (2006.01)
*H01M 4/36* (2006.01)

(52) U.S. Cl.
USPC .......... 429/405; 429/403; 429/144; 429/326; 429/339; 429/340; 429/341; 429/231.9; 429/231.95; 429/246

(58) Field of Classification Search
USPC ........ 429/403, 405, 144, 326, 339, 340, 341, 429/231.9, 231.95, 246
See application file for complete search history.

(56) References Cited

U.S. PATENT DOCUMENTS

| | | | |
|---|---|---|---|
| 3,528,856 | A | 9/1970 | Ivshinsky |
| 3,607,417 | A | 9/1971 | McRae et al. |
| 3,615,835 | A | 10/1971 | Ovshinsky |
| 3,625,769 | A | 12/1971 | Lyall |
| 3,703,415 | A | 11/1972 | Mitoff et al. |
| 3,912,536 | A | 10/1975 | Galli et al. |
| 3,976,509 | A | 8/1976 | Tsai et al. |
| 4,007,057 | A | 2/1977 | Littauer et al. |
| 4,091,182 | A | 5/1978 | Farrington et al. |
| 4,162,202 | A | 7/1979 | Dey |
| 4,163,084 | A | 7/1979 | Tsai et al. |
| 4,210,707 | A | 7/1980 | Farrington |
| 4,402,995 | A | 9/1983 | Fleischer |

(Continued)

FOREIGN PATENT DOCUMENTS

| | | |
|---|---|---|
| EP | 0111213 | 11/1983 |
| EP | 0111214 | 11/1983 |

(Continued)

OTHER PUBLICATIONS

European patent application No. 04794699.1, Examination Report dated May 31, 2007.

(Continued)

*Primary Examiner* — Eugenia Wang
(74) *Attorney, Agent, or Firm* — Weaver Austin Villeneuve & Sampson LLP

(57) ABSTRACT

Non-aqueous alkali metal (e.g., Li)/oxygen battery cells constructed with a protected anode that minimizes anode degradation and maximizes cathode performance by enabling the use of cathode performance enhancing solvents in the catholyte have negligible self-discharge and high deliverable capacity. In particular, protected lithium-oxygen batteries with non-aqueous catholytes have this improved performance.

73 Claims, 5 Drawing Sheets

(56) References Cited

U.S. PATENT DOCUMENTS

| | | |
|---|---|---|
| 4,405,416 A | 9/1983 | Raistrick et al. |
| 4,414,293 A | 11/1983 | Joy et al. |
| 4,504,561 A | 3/1985 | Winsel |
| 4,828,942 A | 5/1989 | Licht |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A | 5/1995 | Licht et al. |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 5,962,171 A | 10/1999 | Boguslavsky et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0028389 A1* | 3/2002 | Sonoda et al. ............... 429/324 |
| 2002/0034688 A1 | 3/2002 | Chu et al. |
| 2002/0068220 A1 | 6/2002 | Wyler |
| 2002/0102465 A1* | 8/2002 | Chen et al. ............... 429/303 |
| 2002/0106563 A1 | 8/2002 | Okawa |
| 2003/0124433 A1 | 7/2003 | Kim |
| 2003/0190501 A1* | 10/2003 | Rendina ............... 429/12 |
| 2003/0224353 A1 | 12/2003 | Steele et al. |
| 2004/0081894 A1 | 4/2004 | Nimon et al. |
| 2004/0126653 A1 | 7/2004 | Visco et al. |
| 2004/0142244 A1 | 7/2004 | Visco et al. |
| 2004/0185334 A1 | 9/2004 | Iwamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |

(56) References Cited

U.S. PATENT DOCUMENTS

| | | |
|---|---|---|
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0172739 A1 | 7/2007 | Visco et al. |
| 2007/0231704 A1 | 10/2007 | Inda |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0286114 A1 | 11/2009 | Visco et al. |
| 2009/0297935 A1 | 12/2009 | Visco et al. |
| 2010/0104934 A1 | 4/2010 | Visco et al. |
| 2011/0014522 A1 | 1/2011 | Visco et al. |
| 2011/0039144 A1 | 2/2011 | Visco et al. |
| 2011/0269031 A1 | 11/2011 | Visco et al. |
| 2012/0009469 A1 | 1/2012 | Visco et al. |
| 2012/0094188 A1 | 4/2012 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-003371 | 1/1982 |
| JP | 57-017568 | 1/1982 |
| JP | 62-243347 | 10/1987 |
| JP | 63-198261 | 8/1988 |
| JP | 09320645 | 12/1997 |
| JP | 2001-351615 | 12/2001 |
| JP | 2002-513991 | 5/2002 |
| WO | 98/28811 | 7/1998 |
| WO | WO99/57770 | 11/1999 |
| WO | 99/65101 | 12/1999 |
| WO | 00/51198 | 8/2000 |
| WO | 01/33651 | 5/2001 |
| WO | 01/89302 | 11/2001 |
| WO | WO02/50933 | 6/2002 |
| WO | 02/095849 | 11/2002 |
| WO | 2004/036669 | 4/2004 |
| WO | WO2005/038953 | 4/2005 |
| WO | WO2005/038962 | 4/2005 |

OTHER PUBLICATIONS

PCT patent application No. PCT/US06/45407, International Search Report dated Aug. 30, 2007.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/245,472, Office Action mailed Feb. 4, 2010.
U.S. Appl. No. 12/475,403, Office Action mailed Feb. 8, 2010.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/612,741, Office Action mailed Nov. 29, 2010.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
U.S. Appl. No. 13/336,459, "Solid State Battery", Visco et al., filed Dec. 23, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action mailed Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
U.S. Appl. No. 13/717,255, "Active Metal Fuel Cells," Visco et al., filed Dec. 17, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
U.S. Appl. No. 11/245,472, Office Action mailed Jan. 8, 2009.
U.S. Appl. No. 11/824,579, Office Action mailed Jan. 29, 2009.
U.S. Appl. No. 11/824,548, Office Action mailed Jan. 26, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
U.S. Appl. No. 10/986,441, Notice of Allowance mailed Jun. 19, 2009.
U.S. Appl. No. 10/986,441, Allowed Claims, Date: 2009.
U.S. Appl. No. 10/772,157, Notice of Allowance mailed Sep. 17, 2009.
AU patent application No. 2004316638, Office Action mailed Aug. 3, 2009.
U.S. Appl. No. 10/825,587, Office Action mailed Apr. 1, 2008.
U.S. Appl. No. 10/772,157, Office Action mailed Nov. 1, 2007.
U.S. Appl. No. 10/772,157, Office Action mailed Feb. 6, 2008.
U.S. Appl. No. 10/772,228, Allowed Claims, Date: 2008.

(56) References Cited

OTHER PUBLICATIONS

U.S. Appl. No. 10/772,228, Notice of Allowance mailed Jan. 22, 2008.
U.S. Appl. No. 10/772,228, Office Action mailed Sep. 21, 2007.
Thokchom, Joykumar S., et al., "Water Durable Lithium Ion Conducting Composite Membranes from the $Li_2O$—$Al_2O_3$—$TiO_2$—$P_2O_5$ Glass-Ceramic", *Journal of The Electrochemical Society*, 154 (4), 2007, pp. A331-A336.
CN patent application No. 200480037293.5, Office Action mailed Aug. 22, 2008.
EP patent application No. 04794699.1, Examination Report mailed Aug. 5, 2008.
U.S. Appl. No. 10/772,157, Office Action mailed Jul. 11, 2008.
U.S. Appl. No. 10/825,587, Office Action mailed Oct. 16, 2008.
U.S. Appl. No. 10/825,587, Office Action mailed Jun. 5, 2008.
AU patent application No. 2003301383, Examination Report mailed Sep. 29, 2008.
U.S. Appl. No. 10/986,441, Office Action mailed Oct. 20, 2008.
WO patent application No. PCT/US06/48755, International Search Report mailed Apr. 7, 2008.
WO patent application No. PCT/US06/48755, Written Opinion mailed Apr. 7, 2008.
U.S. Appl. No. 10/825,587, Notice of Allowance mailed Nov. 24, 2008.
U.S. Appl. No. 10/825,587, Allowed Claims, Date: 2009.
CN patent application No. 200480042697.3, Office Action mailed Feb. 15, 2008.
U.S. Appl. No. 11/245,472, Office Action mailed Jul. 24, 2008.
U.S. Appl. No. 10/772,157, Office Action mailed Dec. 30, 2008.
U.S. Appl. No. 11/824,574, Office Action mailed Dec. 31, 2008.
CN patent application No. 200480042697.3, Office Action mailed Dec. 19, 2008.
U.S. Appl. No. 12/649,245, Office Action mailed Nov. 30, 2010.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/831,066, Allowed Claims, Date: 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/824,579, Office Action mailed Jun. 25, 2010.
U.S. Appl. No. 12/831,066, "Active metal fuel cells", Visco et al., filed Jul. 6, 2010.
U.S. Appl. No. 12/831,066, Office Action mailed Aug. 18, 2010.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
AU patent application No. 2003301383, Notice of Acceptance mailed Nov. 26, 2009.
JP patent application No. 2004-545584, Notification of reason for rejection mailed Jun. 8, 2010.
U.S. Appl. No. 10/731,771, Office Action mailed Sep. 28, 2006.
U.S. Appl. No. 10/731,771, Office Action mailed Mar. 16, 2007.
U.S. Appl. No. 10/772,228, Office Action mailed Nov. 28, 2006.
U.S. Appl. No. 10/824,944, Office Action mailed Sep. 7, 2006.
U.S. Appl. No. 10/824,944, Office Action mailed Mar. 12, 2007.
U.S. Appl. No. 11/823,847, Office Action mailed Sep. 16, 2008.
U.S. Appl. No. 11/824,548, Office Action mailed Mar. 20, 2008.
U.S. Appl. No. 10/825,587, Office Action mailed Jun. 25, 2007.
CN patent application No. 200480037293.5, Office Action mailed Jun. 24, 2010.
U.S. Appl. No. 11/245,472, Office Action mailed Aug. 23, 2007.
U.S. Appl. No. 11/245,472, Office Action mailed Apr. 16, 2008.
U.S. Appl. No. 12/475,403, Office Action mailed Jun. 22, 2010.
U.S. Appl. No. 12/649,245, Office Action mailed Mar. 31, 2010.
U.S. Appl. No. 12/649,245, Office Action mailed Jul. 19, 2010.
AU patent application No. 2004306866, Notice of Acceptance mailed Jun. 17, 2010.
KR patent application No. 10-2005-7006382, Office Action mailed Aug. 31, 2010.
Foster D.L. et al., "Ceramic Membranes for Lithium Batteries", Proceeding of the $42^{nd}$ Power Sources Conference, Jun. 2006, P2.14.
Ogasawara T. et al., "Rechargeable $Li_2O_2$ Electrode for Lithium Batteries", J. Am. Chem. Soc. 128(4), 2006, pp. 1390-1393.
Read J., "Electrolyte Formulation and Temperature Performance of the $Li/O_2$ Battery", Proceeding of the $9^{th}$ Electrochemical Power Sources R&D Symposium, Jun. 2005, 15 pages.
U.S. Appl. No. 11/824,597, Notice of Allowance mailed Sep. 9, 2010.
U.S. Appl. No. 11/824,597, Allowed Claims, Date: 2010.
U.S. Appl. No. 12/475,403, Notice of Allowance mailed Oct. 7, 2010.
U.S. Appl. No. 12/475,403, Allowed Claims, Date: 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.
International Search Report dated Oct. 18, 2005 from related International Application No. PCT/US2004/033372.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in $Li2O$—$Al2O3$—$TiO2$—$SiO2$—$P2O5$ Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3$, M = Al, Sc, Y, and La) Systems", Dept. of Industrial Chemistry, pp. 590-591.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$—$P_2O_5$", Solid State Ionics, 96 (1997), pp. 195-200.

(56) References Cited

OTHER PUBLICATIONS

Fu, Jie, "Fast Li+ ion conducting glass-ceramics in the system $Li_2O$—$Al_2O_3$—$_{GeO2}$—$P_2O_5$" Solid State Ionics 104 (1997), pp. 191-194.
Aono, et al., "DC Conductivity of $Li_{1.3}Al_{0.3}Ti_{1.7}(PO_4)_3$," Ceramic with Li Electrodes, Chemistry Letters, 1991, pp. 1567-1570.
Aono, et al., "Electrical Properties of Sintered Lithium Titanium Phosphate Ceramics $(Li_{1+X}M_XTi_{2-X}PO_4)_3$, $M^{3+}=Al^{3+},Sc^{3+}$, or $Y^{3+})$", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
European patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and SYMP. INT. VEH. ELECTR., RAPP, 4$^{th}$ vol. 1, paper 32.4, 23 pp., Publisher: Electr. Veh. Counc., New York, N.Y. Conden: 39UPAD, 1976.
International patent application No. PCT/US2004/033361, International Search Report dated Jan. 16, 2006.
International patent application No. PCT/US2004/033424, International Search Report dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
De Jonghe et al., "Chemical Protection of a Lithium Surface", PolyPlus Battery Company, U.S. Appl. No. 11/092,781, filed Mar. 28, 2005, pp. 1-34.
U.S. Appl. No. 13/615,351, Notice of Allowance mailed May 31, 2013.
U.S. Appl. No. 13/708,540, Office Action mailed Jun. 17, 2013.
U.S. Appl. No. 13/464,835, Office Action mailed Aug. 29, 2013.
Choi, et al. "Challenges Facing Lithium Batteries and Electrical Double-Layer Capacitors" www.angewandte.org Angew. Chem. Int. Ed. 2012, 51, 9994-10024 (31 pages).
Freunberger, et al. "Reactions in the Rechargeable Lithium-$O_2$ Battery with Alkyl Carbonate Electrolytes" ACS Publications, J. Am. Chem. Soc. 2011, 133, 8040-8047 (8 pages).
Freunberger, et al. "The Lithium-Oxygen Battery with Ether-Based Electrolytes" Wiley Online Library, Angew. Chem. Int. Ed. 2011, 50, 1-6 (6 pages).
JP patent application No. 2011-513742, Office Action mailed Oct. 8, 2013.
JP patent application No. 2006-552102, Office Action mailed Nov. 26, 2013.

* cited by examiner

LI/AIR NON-AQUEOUS BATTERIES

CROSS-REFERENCE TO RELATED APPLICATIONS

This application claims priority from U.S. Provisional Application No. 60/739,224 filed Nov. 23, 2005, titled LI/AIR BATTERIES WITH PROTECTED LI ANODE AND NON-AQUEOUS ELECTROLYTE, the disclosure of which is incorporated by reference herein. Further disclosures that are incorporated by reference herein are U.S. patent application Ser. No. 10/727,157 filed Dec. 2, 2003, issued as U.S. Pat. No. 7,818,519 on Oct. 19, 2010 and U.S. patent application Ser. No. 10/824,994, field Apr. 14, 2004, issued as U.S. Pat. No. 7,282,295 on Oct. 16, 2007.

BACKGROUND OF THE INVENTION

1. Field of the Invention

The present invention relates generally to non-aqueous alkali metal/oxygen battery cells, and to electrolyte solvents that are beneficial to their performance. An exemplary embodiment of the instant invention is a non-aqueous lithium/oxygen battery cell comprising a protected Li anode, a non-aqueous electrolyte and molecular oxygen accessed from the ambient air environment.

2. Related Art

The low equivalent weight of alkali metals, such as lithium, renders them particularly attractive as a battery electrode component. For example, lithium metal is both lightweight and energetic. The faradaic capacity of lithuim is 3800 mAh/gr while it's electrochemical potential vs. SHE (standard hydrogen electrode) is −3.05 V. Lithium batteries are prevalent today: lithium primaries are commonplace (e.g., $Li/MnO2$, $Li/FeS2$, $Li/SO_2$ and $Li/SOCl_2$) and Li-Ion is the premier secondary battery for powering digital electronics. In no short measure, the incompatibility of Li anodes in most solvents was a major obstacle in the early development of what are now considered conventional Li batteries. Generally, Li anode stability hinges on the formation and integrity of a protective solid electrolyte interphase (SEI) layer that forms on the surface of the anode (e.g., Li metal or LiCx) in contact with battery electrolyte. Targeting an electrolyte composition to form a stabilizing SEI layer that impedes further reaction but does not significantly hinder battery performance is not a trivial task. Exhaustive experimentation is required, and alteration of the electrolyte formulation in any way or contamination by moisture will generally ruin the integrity of the layer and the functionality of the anode. Electrolyte preparation is also quite tricky, and great care and effort is needed to ensure that electrolyte composition (combination of salts and solvents) is properly formulated and "dry" (low moisture content); to this end manufactures expend significant resources purifying solvents and preventing moisture contamination during electrolyte preparation and battery assembly. Electrolyte moisture levels in conventional lithium batteries are typically kept below about 50 ppm. Moreover, there are only a limited number of solvents that are compatible with Li anodes, and this severely restricts electrolyte optimization for the cathode's benefit.

Conventional lithium batteries (both lithium metal primaries and Li-Ion rechargeable) are performing to near optimal levels, so enhancement in energy density is expected to improve only incrementally from this time forward. To meet the present demand for significant increases in battery operating life and energy density next generation lithium battery systems need to make use of lighter and more energetic cathode materials. The use of oxygen as an electrochemically active cathode reactant in a lithium battery can be highly advantageous. Oxygen like lithium has a very low equivalent weight, and its electrochemical potential vs. Li metal indicates that $Li/O_2$ battery cells can provide a potential of about 3V with a theoretical energy density of about 5200 Wh/kg. What's more, $O_2$ is available, "freely", from the air, if it can be properly harnessed.

K M Abraham and Z. Jiang describe a $Li/O_2$ polymer electrolyte battery in U.S. Pat. No. 5,510,209 filed on Jan. 5, 1995 and in a technical paper published shortly thereafter in the J. Electrochemical Soc., Vol 143, No. 1 Jan. 1996. The battery cell disclosed by Abraham and Jiang uses a polymer electrolyte containing organic liquid electrolyte (effectively a gel electrolyte) as a separator sandwiched between a lithium metal anode and an oxygen cathode. If exposed to air, the polymer electrolyte will not prevent moisture from reaching the lithium anode, as no polymers are impervious to moisture, particularly polymer electrolytes that are imbibed with hydroscopic liquid electrolyte (such as a PC/EC mixture with $LiPF_6$). The battery cells disclosed by Abraham, if exposed to ambient air, are therefore susceptible to high rates of self-discharge and severe anode degradation associated with lithium corrosion by moisture. Furthermore, batteries that self-discharge also tend to have limited operating life and generally low capacity ($mAh/cm^2$). Abraham also mentions in his technical paper that cathodes used in $Li/O_2$ battery cells tend to form discharge products in the cathode that choke the pores and limit battery performance.

There is a pressing need for practical high energy density batteries to meet the present demands for increased battery life. Li/Air batteries have the potential to meet this demand, but are not yet practical due to self-discharge caused by anode corrosion with moisture from the air and poor cathode performance. Accordingly, there is an immediate need to enable practical high energy density Li/Air batteries having high delivered area capacity ($mAh/cm^2$) with minimal self-discharge by protecting the anode and generally improving cathode performance.

SUMMARY OF THE INVENTION

In one aspect, the present invention provides an improved non-aqueous alkali metal (e.g., Li)/oxygen battery cell with negligible self-discharge and high deliverable capacity. The battery cell is considered non-aqueous in that it has a non-aqueous electrolyte comprising at least one non-aqueous solvent, and non-aqueous solvents represent more than 50% of the total electrolyte volume. The battery cell also has an oxygen electrode (cathode) and a protected alkali metal electrode (protected alkali metal anode) that prevents direct contact of the alkali metal anode with components on the cathode side of the cell. The protection is imparted to the anode by a protective membrane architecture that conducts the alkali metal ion of the anode (e.g., Li ions) and is impervious to electrolyte, moisture and air. The de-coupling of the anode from the cathode side (cathode environment) of the cell effectively partitions the battery to have a cathode compartment and an anode. The cathode compartment contains the oxygen electrode, the non-aqueous electrolyte and molecular oxygen (at least present during cell operation). When used in conjunction with a protected anode the non-aqueous electrolyte of the cathode compartment is also referred to as catholyte, which is defined as electrolyte in contact with the cathode (e.g., oxygen electrode). In a preferred embodiment of the battery cell, lithium is the alkali metal of the anode (e.g., a Li metal anode) and molecular oxygen is accessed from the ambient air environment through air access holes in the battery cell casing. In such an embodiment, the battery cell is also referred to as a non-aqueous Li/Air cell (or simply Li/Air cell) and the oxygen electrode is also referred to as an air electrode.

A key aspect of the present invention is the use of a protected anode in the battery cell to minimize anode degradation and maximize cathode performance. In accordance with the present invention, a protected anode comprises an alkali metal anode having on a major surface an ionically conductive protective membrane architecture that de-couples the alkali metal anode from the catholyte and more generally from the environment of the cathode. Protective membrane architectures are fully described in U.S. patent application Ser. Nos. 10/727,157 (Publication No. US20040197641 A1; now U.S. Pat. No. 7,645,543, issued Jan. 12, 2010) and 10/824,944 (Publication No. US20050175894 A1; now U.S. Pat. No. 7,282,295, issued Oct. 16, 2007) commonly assigned with the present application to PolyPlus Battery Company. The protective membrane architectures described therein are incorporated by reference herein. The protective membrane architecture (PMA) comprises one or more materials configured to provide a first membrane surface chemically compatible with the alkali metal anode in contact with the anode, and a second membrane surface substantially impervious to and chemically compatible with the cathode side environment. Generally, the material that provides the second membrane surface is impervious and comprises a solid electrolyte conductive to the alkali metal ion of the anode and stable to air, moisture and catholyte.

In one embodiment the PMA is a monolithic solid electrolyte that provides ionic transport for the alkali metal of the anode and is chemically stable to both the alkali metal anode and the cathode environment.

In an alternative embodiment the PMA is a composite composed of at least two components of different materials, one chemically compatible with the anode, the other chemically compatible with the cathode environment; generally ambient air and catholyte. The composite may be composed of discrete layers or the same layers may have a graded transition.

In another embodiment the protective membrane architecture is a composite composed of an interlayer between a solid electrolyte membrane and the alkali metal anode whereby the interlayer is impregnated with anolyte (electrolyte in contact with the anode). The interlayer may be an alkali metal ion conducting separator layer with a non-aqueous anolyte, the separator layer being compatible with the alkali metal anode in contact with the anode.

A preferred embodiment of the present invention is a non-aqueous Li/Air battery cell having negligible self-discharge, high capacity (mAh/cm$^2$), and long battery life. Generally, ambient air contains significant quantities of moisture (depending on relative humidity). During cell operation the non-aqueous catholyte becomes increasingly contaminated with moisture over time as moist air enters the cathode compartment along with molecular oxygen. In accordance with the present invention, the Li/Air battery cells of the instant invention are able to tolerate high levels of moisture content in the catholyte while maintaining negligible self discharge and delivering high capacity (mAh/cm$^2$) due to the chemical stability and mechanical ruggedness of the protective membrane architecture.

Typically, the self-discharge rate of activated Li/Air battery cells of the instant invention is less than 0.01 mA/cm$^2$, more preferably less than 0.005 mA/cm and even more preferably less than 0.001 mA/cm$^2$. Moreover, the battery cells are able to retain these low self-discharge rates even in the presence of high levels of moisture content in the catholyte. Once the battery cell is activated by exposure of the oxygen electrode to air, the moisture content in the non-aqueous catholyte will start to rise. Typically, Li/Air battery cells of the present invention have post activation moisture content greater than 100 ppm moisture. In some embodiments the moisture content is greater than 200 ppm; and may even reach levels greater than 500 ppm. Furthermore, in the range of 100 ppm to 500 ppm of moisture in the catholyte the self-discharge rate of the batteries of the instant invention is typically less than 0.01 mA/cm$^2$ Even saturation of the catholyte with ambient moisture, a serious problem for a Li/Air battery with unprotected lithium, does not adversely affect the stability of the protected lithium electrode. For instance, even at moisture levels greater than 1000 ppm in the catholyte the self-discharge rate of the battery cell is less than 0.01 mA/cm$^2$.

Due in part to the negligible self-discharge rate, Li/Air battery cells of the instant invention can achieve very high deliverable capacity, preferably greater than 10 mAh/cm$^2$; more preferably greater than 25 mAh/cm$^2$; and even more preferably greater than 70 mAh/cm$^2$. To attain such high performance the protected anode must be mechanically robust and chemically durable over the extent of discharge. For instance, in order for a Li/Air cell to achieve a capacity of 70 mAh/cm$^2$ (such as is demonstrated in the examples that follow) the protected anode must be able to discharge the equivalent of about 350 µm of lithium metal through the protective membrane architecture without mechanical failure (10 mAh/cm$^2$ corresponds to about 50 µm of Li metal). Accordingly, the lithium metal thickness of the Li anode in Li/Air battery cells of the instant invention is preferably greater than 100 µm, more preferably greater than 200 µm and even more preferably greater than 300 µm.

In another aspect, the present invention provides catholyte having performance enhancing solvents and solvent mixtures that benefit the oxygen electrode and improve battery performance of non-aqueous lithium-oxygen battery cells of the instant invention (e.g., non-aqueous Li/Air). The solvent is present in the catholyte at greater than 5% by volume (excluding salts), more typically greater than 10% and even more typically greater than 20% by volume. Suitable solvents include but are not limited to non-aqueous donor solvents, non-aqueous acceptor solvents, as well as other solvents (both protic and aprotic) that are incompatible with lithium (i.e., do not partake in the formation of a protective SEI), and solvents that are generally considered to be compatible with lithium (i.e., do partake in the formation of a protective SEI) and combinations thereof.

In another aspect, the present invention provides lithium metal/oxygen (e.g., Li/Air) battery cells in which a non-aqueous catholyte solvent is employed in the battery cell not for its compatibility with the Li anode but for its beneficial effects in the oxygen electrode. The ability to use cathode performance enhancing solvents and electrolytes purely for their suitability to benefit the oxygen electrode is a tremendous advantage in the practical realization of a lithium/air battery. Suitable solvents are chemically compatible with the oxygen electrode and with the surface of the protective membrane architecture in contact with the catholyte, but do not require compatibility with the Li anode. This affords wide latitude in the choice of suitable catholyte solvents including the use of lithium incompatible solvents that instead of forming a protective SEI layer adversely react with unprotected lithium degrading its surface, and in some instances aggressively corroding the metal. For example, all non-aqueous protic solvents react with lithium and cannot be used in conventional Li batteries because of the following reaction:

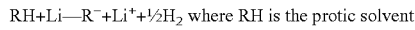
RH+Li—R⁻+Li⁺+½H₂ where RH is the protic solvent

Moreover, most aprotic solvents are generally incompatible with lithium, and do not form a protective SEI. In accordance with the present invention, anode incompatible solvents such as these are enabled for use in the battery cells of the instant invention because of the presence of the protective membrane architecture. Solvents that are suitable for use in the battery cells of the present invention generally include both non-aqueous protic solvents and aprotic solvents that are anode incompatible, as well as other solvents that are generally considered to be compatible with alkali metals and do form an SEI layer (such as ethers and organic carbonates), and combinations thereof. Moreover, water may also be added to the catholyte intentionally as a cathode performance enhancing additive or as a means to pre-condition components of the cathode compartment to moisture prior to cell activation.

Examples of aprotic solvents that are incompatible with lithium but are suitable for use in catholytes of the instant invention include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N' tetraethylsulfamide, tetramethylurea (TMU), 2-pyrrolidone, N-methylpyrrolidone, N-methylpyrrolidinone), amines (e.g., butylamine, ehtylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, and organophosphorous solvents (e.g., tributylphosphate, trimethylphosphate, hexamethylphosphoramide (HMPA)).

Examples of non-aqueous protic solvents (all of which are incompatible with lithium) suitable for use in catholytes of the present invention include diols (e.g., ethylene glycol, polyethylene glycol, ethanediol, propanediol) and alcohols (ethanol, methanol, propanol, butanol, methoxyethanol). The class of diols, particularly ethylene glycol, has been found to be particularly beneficial to the performance of the oxygen electrode.

Examples of solvents generally considered to be compatible with lithium and are suitable for use in catholytes of the instant invention include ethers (e.g., 2-Methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/monoglyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), formates (e.g., Methyl Formate) and butyrolactone (GBL).

It has also been found that battery performance improves significantly by incorporating a non-aqueous solvent having a high donor number (DN) and/or a high acceptor number (AN) at concentrations in the catholyte that are at least 5% by volume (excluding salts), more preferably at least 10% and even more preferably at least 20%. Donor and acceptor numbers are figures of merit that correspond to the ability of the solvent to coordinate cations (DN) and anions (AN). In one preferred embodiment of the invention, the combination of both a high donor number and a high acceptor number solvent in the catholyte provides a synergistic effect on the performance of the oxygen electrode. When both donor and acceptor solvents are present in the electrolyte, the volumetric ratio of the donor to acceptor solvent typically ranges from about 20:1 to 1:20, more preferably the ratio is about 10:1 to 1:10, and even more preferably the ratio is about 3:1 to 1:3. In one embodiment, the donor solvent to acceptor solvent ratio is about 1:2. In another embodiment, the ratio of donor to acceptor solvent is about 1:1. In a preferred embodiment, the catholyte includes an acceptor solvent at 65% by volume and a donor solvent at 35% by volume.

Examples of donor solvents include hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. Preferred donor solvents have a donor number of at least 15, more preferably between about 15 and 40 and most preferably between about 18-40. Particularly preferred donor solvents include N,N-diethylformamide, N,N-dimethylformamide (DMF), dimethylsulfoxide (DMSO), N,N-dimethylacetamide (DMAC); for example, DMF Acceptor solvents are those solvents which can be characterized as Lewis acids (they may be protic or aprotic solvents) and promote solvation of anions. Examples include alcohols such as methanol, glycols such as ethylene glycol and polyglycols such as polyethylene glycol as well as nitromethane, triflouroacetic acide, trifluoromethanesulfonic acid, sulfur dioxide and boron triflouride. A particularly preferred acceptor solvent is ethylene glycol (EG).

In another aspect, the present invention provides an optional porous reservoir layer in which catholyte resides and the layer is composed of a material that is chemically stable to and can accommodate products of discharge formed inside the cathode compartment. The layer is disposed between the oxygen electrode and the protective membrane architecture, and in contact with the oxygen electrode. The layer may be a discrete component or an integral part of the oxygen electrode. The material of the reservoir layer is fully oxidized, preferably it is a fully oxidized metal or a fully oxidized semi-metal. A particular preferred embodiment is a discrete and fully oxidized metal reservoir layer such as a zirconia cloth.

The physical structure of the reservoir layer, in terms of its thickness and porosity, is dependent on the battery cell's application. The reservoir layers are generally very porous in order to contain as much catholyte as possible and accommodate discharge product without clogging through porosity. Ideally the porosity of the reservoir layer is as high as possible while still maintaining structural integrity. The porous reservoirs should have through porosity that is in excess of 50% by volume and can be as high as 99.5%. More preferably the porosity is in the range of about 80% to 98% open. Reservoir layers suitable for use in batteries of the instant invention should generally be in the range of about 10 to 1000 microns thick, more preferably 25 to 500 microns thick and even more preferably in the range of 50 to 200 microns thick.

The battery cells of the instant invention are of the non-aqueous alkali metal/oxygen type comprising an alkali metal anode having a protective-membrane-architecture (PMA) on at least one major surface of the anode, a non-aqueous catholyte and a cathode with oxygen as the electrochemically active component (oxygen electrode). In a preferred embodiment the oxygen is accessed from the ambient air environment, and the alkali metal is Li in the form of Li metal. In a preferred embodiment, the protective membrane architecture comprises a non-aqueous anolyte impregnated inside a porous polymer interlayer that is adjacent to and stable with an impervious, water stable, ionically conductive membrane. In a preferred embodiment the ionically conductive membrane has the general stoichiometry $Li_{1+x}Al_x(Ge_{1-y}Ti_y)_{2-x}(PO_4)_3$, where $X \leq 0.8$ and $0 \leq Y \leq 1.0$. The catholyte may comprise Li-incompatible and Li-compatible solvents. In a preferred embodiment, the solvents are Li-incompatible and comprise a mixture of a protic acceptor solvent and a donor solvent for example, ethylene glycol and DMF, respectively. In a preferred embodiment, the donor to acceptor solvent volume ratio is 2:1. In a preferred embodiment, the ratio is 2:1 and EG is present in the catholyte at 66% by solvent volume.

In another aspect of the present invention methods to fabricate the alkali metal/oxygen non-aqueous battery cells of the instant invention are provided.

These and other features of the invention will be further described and exemplified in the drawings and detailed description below. A non-aqueous Li/Air battery will generally be used to describe the various aspects of the invention.

DETAILED DESCRIPTION OF SPECIFIC EMBODIMENTS

Figure 1:
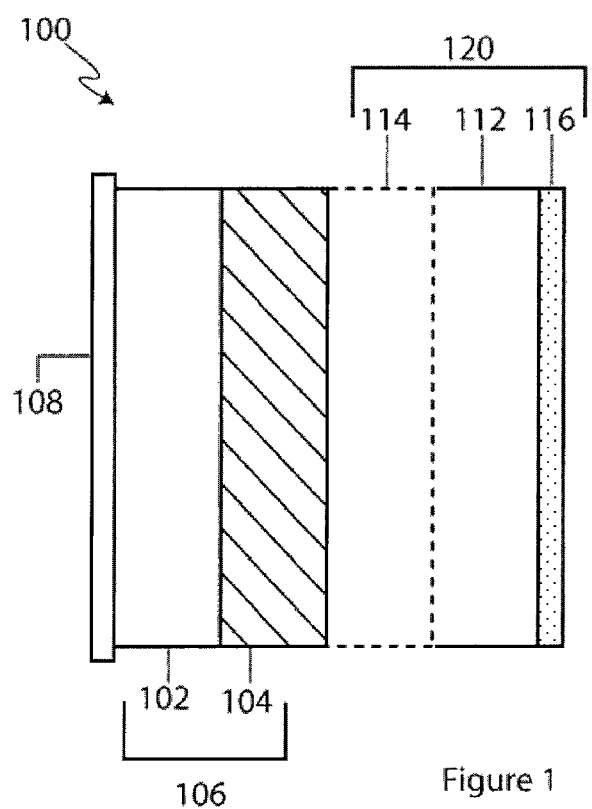
FIG. 1 illustrates a cross sectional view of a schematic drawing (not drawn to scale) of a single sided non-aqueous alkali metal/air battery cell in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The present invention provides lithium-oxygen batteries with high capacity, negligible self-discharge and generally improved performance. The batteries are preferably constructed having a protected anode that minimizes anode degradation and maximizes cathode performance by enabling the use of cathode performance enhancing solvents in the catholyte.

Generally, the protected anode has a negative electrode (also referred to as the anode) that is protected from direct contact with components on the positive electrode side of the cell (also referred to as the cathode environment) by a protective-membrane-architecture (PMA). The negative electrode comprises alkali metal, and is also referred to as an alkali metal anode. In combination, the alkali metal anode and the protective membrane architecture form a protected anode (or protected alkali metal anode). The protective membrane architecture is conductive to the alkali metal ion (e.g., Li ion) of the anode but otherwise chemically and mechanically isolates the anode from the cathode environment. Protected anodes and protected anode battery cell structures are fully described in commonly assigned U.S. patent application Ser. Nos. 10/772,157 (now U.S. Pat. No. 7,645,543, issued Jan. 12, 2010) and 10/824,944 (now U.S. Pat. No. 7,282,295, issued Oct. 16, 2007), the disclosures of which are incorporated by reference herein in their entirety and for all purposes.

The de-coupling of the anode from the cathode environment effectively partitions the battery to have a cathode compartment comprising the oxygen electrode (cathode), catholyte (electrolyte in contact with the cathode) and, optionally, a porous reservoir layer in which catholyte resides and the layer is composed of a material that is chemically stable to and can accommodate cathode discharge products. Electrochemical reduction and oxidation of molecular oxygen occurs on the surface or in the bulk of the oxygen electrode. In some embodiments, oxygen may be a dissolved component of the catholyte, or it may be stored external to the battery cell as gaseous or liquid molecular oxygen and plumbed into the cathode compartment. In a preferred embodiment, ambient air is the source of molecular oxygen, and the oxygen is accessed into the cathode compartment from the ambient air.

A preferred embodiment of the instant invention is a protected Li/Air battery cell having a protected lithium anode and molecular oxygen that is accessed from the ambient air environment. Important advantages of protected Li/Air batteries of the instant invention having a protective membrane architecture (PMA) include the following:

1. The presence of a PMA separating the lithium electrode from the oxygen (air) electrode allows the fabrication of Li/Air cells where the choice of solvent and electrolyte is not limited by compatibility with lithium.

2. In some instances, the use of non-aqueous catholyte in the cathode compartment may also be advantageous in terms of increased stability of a solid electrolyte membrane component of the PMA relative to configurations where aqueous electrolyte is used. Strongly basic aqueous solutions which have been used as electrolytes are also known to etch glass and ceramics.

3. The ability to choose the non-aqueous solvent and catholyte systems for the oxygen electrode without concern for reactivity towards lithium affords a tremendous advantage in terms of optimization of the cathode components, and chemical compatibility of the non-aqueous solvent/catholyte with cathode components.

4. Since the PMA separates the lithium electrode from the oxygen electrode, there is no need for a microporous Celgard type separator or gel polymer electrolyte separator that can be chemically attacked by peroxide species formed from the reduction of oxygen.

5. The chemical stability and mechanical ruggedness of the PMA, as described herein, provides tolerance to high levels of moisture content in the catholyte with negligible battery self-discharge, long battery operating life and enables the battery to achieve high deliverable discharge capacity ($mAh/cm^2$).

While previous researchers have developed unprotected Lithium/Air cells using non-aqueous polymer electrolytes, ambient air generally contains significant quantities of water (dependent on relative humidity levels), so the non-aqueous electrolyte becomes increasingly contaminated with moisture over time, leading to self-discharge of unprotected Li/Air cells, and severe degradation of the lithium electrode takes place. In the case of protected lithium, this is not a problem; in fact, protected Lithium/Air cells can tolerate high levels of moisture in the catholyte while still maintaining a negligible corrosion current.

Typically, the self-discharge rate of activated Li/Air battery cells of the instant invention is less than 0.01 mA/cm$^2$, more preferably less than 0.005 mA/cm$^2$ and even more preferably less than 0.001 mA/cm$^2$. Moreover, the battery cells are able to retain these low self-discharge rates even in the presence of high levels of moisture content in the catholyte. Once the battery cell is activated by exposure of the oxygen electrode to air, the moisture content in the non-aqueous catholyte will start to rise. Typically, Li/Air battery cells of the present invention have post activation moisture content greater than 100 ppm moisture. In some embodiments the moisture content is greater than 200 ppm; and may even reach levels greater than 500 ppm. Furthermore, in the range of 100 ppm to 500 ppm of moisture in the catholyte the self-discharge rate of the batteries of the instant invention is typically less than 0.01 mA/cm$^2$ Typically, the self discharge rate after battery activation (e.g., exposing the air electrode to the ambient air) is less than 0.01 mA/cm$^2$. Even saturation of the catholyte with ambient moisture, a serious problem for a Li/Air battery with unprotected lithium, does not adversely affect the stability of the protected lithium electrode. For instance, even at moisture levels greater than 1000 ppm in the catholyte the self-discharge rate of the battery cell is less than 0.01 mA/cm$^2$.

Due in part to the negligible self-discharge rate, Li/Air battery cells of the instant invention can achieve very high deliverable capacity preferably greater than 10 mAh/cm$^2$; more preferably greater than 25 mAh/cm$^2$; and even more preferably greater than 70 mAh/cm$^2$. To attain such high performance the protected anode must be mechanically robust and chemically durable over the extent of discharge. For instance, in order for a Li/Air cell to achieve a capacity of 70 mAh/cm$^2$ (as will be demonstrated in the examples that follow) the protected anode must be able to discharge the equivalent of about 350 μm of lithium metal through the protective membrane architecture without mechanical failure (10 mAh/cm$^2$ corresponds to about 50 μm of Li metal). Accordingly, the lithium metal thickness of the Li anode in Li/Air battery cells of the instant invention is preferably greater than 100 μm, more preferably greater than 200 μm and even more preferably greater than 300 μm.

The lithium/oxygen battery cells of the instant invention are applicable for use as primary or secondary batteries. While the invention is not limited to any particular theory of operation, it is generally believed that during discharge of a non-aqueous Li/Air cell, oxygen reduction takes place on the surface or in the bulk of the oxygen electrode and alkali metal ions (e.g., Li ions), liberated by oxidation of the anode, move through the PMA into the catholyte, and a discharge product generally forms comprising reduced oxygen and the alkali metal ion of the anode (e.g., Li$_2$O$_2$). The discharge product generally precipitates in the cathode compartment; particularly it tends to precipitate in the pores of the oxygen electrode and in the catholyte. It may also dissolve, at least partially, in the catholyte. During charge, in the case of a secondary cell, it is generally believed that the reverse process takes place, the discharge product is re-oxidized and the alkali metal ion moves via the catholyte from the cathode compartment through the PMA and back to the anode along with concomitant anode reduction.

The catholyte used in battery cells of the instant invention is non-aqueous in that it comprises at least one non-aqueous solvent, and non-aqueous solvents represent more than 50% of the catholyte's solvent volume. Both non-aqueous protic and aprotic solvents are suitable for use in the catholyte. Generally, the catholytes of the instant invention are not intended to contain moisture, though moisture may be present as an impurity or an incidental contaminant from the air. In some embodiments, however, water may be intentionally incorporated into the catholyte as a minority solvent, and certainly less than 50% of the total solvent volume. This may be done, for example, to pre-condition the cathode compartment for the eventual uptake of moisture from the air once the battery cell is activated; it may also be used as a performance additive.

The use of the term non-aqueous clearly distinguishes the catholytes of the instant invention from aqueous catholyte solutions that have utility in aqueous Li/Air batteries, whereby water is a critical component of the electrochemical reaction at the cathode. For example, aqueous based alkali metal/air batteries require a half mole of water for every mole of alkali metal oxidized during electrochemical discharge. The discharge product is alkali metal hydroxide (e.g., LiOH). For instance, in the case of an aqueous Li/Air battery, such as are described in commonly assigned U.S. application Ser. No. 10/772,157 (Publication No. US20040197641 A1; now U.S. Pat. No. 7,645,543, issued Jan. 12, 2010), for every gram of lithium discharged 1.3 grams of water is required for oxygen reduction.

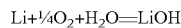

$$Li + \tfrac{1}{4}O_2 + H_2O = LiOH$$

Aqueous Li/Air batteries involve oxygen reacting with water and are fundamentally different from non-aqueous alkali metal/air batteries of the present invention, which are based on non-aqueous catholytes comprising non-aqueous solvents and whereby water is not a critical/consumable component of the electrochemical reaction at the cathode. While the invention is not limited to any particular theory of operation, it is believed that the non-aqueous lithium/oxygen cells (e.g., non-aqueous Li/Air) of the instant invention are based on the following electrochemical reactions, in which an aqueous constituent is not required or consumed and the discharge products are believed to contain lithium oxides (e.g., lithium peroxide).

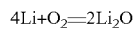

$$4Li + O_2 = 2Li_2O$$

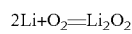

$$2Li + O_2 = Li_2O_2$$

The battery cells of the instant invention have a protective membrane architecture that chemically and mechanically isolates the anode so that it is not in direct contact with catholyte. This effective de-coupling of the cathode compartment from the alkali metal anode allows optimization of catholyte components including non-aqueous solvents, salts (e.g., alkali metal cation salts) and additives (e.g., discharge product solubility agents) for performance of and compatibility with the cathode, without consideration of its effect on the anode; for instance, for increased solubility of discharge products and fast ion and oxygen transport. As a result, the inventors have discovered non-aqueous solvents that are generally beneficial for the performance of the battery cells, and particularly beneficial for the oxygen electrode. In some instances, the non-aqueous solvents are incompatible toward the alkali metal of the anode, but are enabled for use in battery cells of the instant invention because of the presence of the protective membrane architecture. The ability to use alkali metal incompatible solvents to optimize catholyte in order to enhance performance of the oxygen electrode is a tremendous advantage in the practical realization of alkali metal/oxygen non-aqueous battery cells. Generally, all non-aqueous solvents are suitable as catholyte solvent in batteries of the instant invention so long as they are chemically compatible with the protective membrane architecture in contact with the catholyte and compatible with the oxygen electrode. These include solvents that are incompatible and compatible with lithium metal, donor and acceptor solvents and as well as other solvents and combinations thereof.

Specific Embodiments

The invention is now further described in more detail with reference to specific embodiments.

Referring now to FIG. 1 an alkali metal/oxygen non-aqueous battery cell, in accordance with a preferred embodiment of the present invention, is shown. The cell 100 includes an alkali metal anode 102 (e.g., Li metal) protected on one of its two major surfaces by a protective-membrane-architecture (PMA) 104. In combination, the alkali metal anode 102 and protective membrane architecture 104 are commonly referred to as a protected anode 106. The protective membrane architecture comprises one or more materials configured to provide a first membrane surface chemically compatible with the alkali metal anode in contact with the anode, and a second membrane surface substantially impervious to and chemically compatible with the cathode side environment. Optionally, the second surface of the alkali metal anode 102, on the side opposite that of the protective membrane architecture, may have a current collector foil (e.g., Cu foil) 108. The current collector serves to conduct electrons between a cell terminal (not shown) and the alkali metal anode 102 (such as lithium) to which the current collector 108 is affixed. The cell terminal is in electrical communication with the anode. Adjacent to the protective membrane architecture on the side opposite the alkali metal anode is the cathode compartment 120. Components of the cathode compartment are isolated from direct contact with the anode by the protective membrane architecture 104. The cathode compartment includes an oxygen electrode 112, catholyte and optionally a porous reservoir layer 114. The catholyte is in contact with both the protective membrane architecture on the side opposite the alkali metal anode and in contact with the oxygen electrode 112. Because the protective membrane architecture 104 is conductive to the alkali metal ion of the anode and in contact with the catholyte, the oxygen electrode is also in ionic communication with the anode. Accordingly, ionic communication within the battery cell extends from the anode to the cathode, as it must. In some embodiments, the electronic isolation provided by the protective membrane architecture is sufficient to allow the oxygen electrode 112 to be in direct contact with the surface of the protective membrane architecture opposite the anode. In such embodiments the membrane architecture provides the needed electronic isolation between the cathode structure and the alkali metal anode. In an alternative embodiment, a separator material (not shown) is disposed between the oxygen electrode and the protective membrane architecture to provide additional electronic isolation as well as a means to prevent mechanical abrasion damage to the surface of the protective membrane architecture. Suitable separator materials are electronically insulating and have a pore structure capable of containing catholyte to facilitate alkali metal ion transport through the cell. For instance, the separator may be a gel polymer electrolyte or a microporous plastic film such as Celgard 2400. Optionally, a porous reservoir layer 114 may be disposed between the protective membrane architecture and the oxygen electrode, in contact with the oxygen electrode. The porous reservoir layer in which catholyte resides is able to accommodate discharge product. In order to assure chemical stability of the reservoir layer in contact with strong oxidizing discharge product, suitable porous reservoir layers are made from fully oxidized materials; for example porous $ZrO_2$.

Referring back to FIG. 1, the battery cell 100 is depicted in a preferred embodiment whereby molecular oxygen is accessed from ambient air. Accordingly, the cathode compartment 120 is exposed to air on the side opposite the protective membrane architecture 104. Access to the air may be realized through the battery casing. For instance, the battery casing, not shown, may contain air access holes on the side adjacent to the oxygen electrode that provide passageway for air to enter the cathode compartment for oxygen reduction at the oxygen electrode 112. In this embodiment, an optional gas diffusion membrane 116 may be disposed adjacent to the oxygen electrode 112 on the side opposite the anode. The gas diffusion membrane is used to adjust airflow, it may also be used to prevent, or decrease the rate of, components from the cathode compartment escaping, for example catholyte solvents evaporating out of the cell. Suitable gas diffusion membranes include polymer films such as polytetraflouroethylene membranes with a Gurley number of approximately 700 seconds for example. By using ambient air as a source of oxygen, this embodiment provides, in principle, an unlimited supply of molecular oxygen to the cathode compartment and to the oxygen electrode particularly. The Li/Air cell shown in FIG. 1 is generally intended for use in ambient air conditions. It may also be positioned inside a chamber with a controllable environment that contains molecular oxygen, such as an environmental chamber.

In one embodiment, the alkali metal/air battery cells of the instant invention can be manufactured with a sealing tab (not shown) that is capable of closing off the cathode compartment from air until the battery cell is activated, for instance by peeling off the sealing tab. The sealing tab may be positioned on top of the battery case (not shown) covering air access holes adjacent to the oxygen electrode. Re-positioning the sealing tab to cover the holes may be used to deactivate the battery. Once deactivated the battery may still deliver at least a modicum of power by making use of remnant or even a reserve of molecular oxygen inside the cathode compartment. Intermittent deactivation can be an important feature of the batteries of the instant invention depending on their application. For instance, the batteries may encounter an environment that could damage the cathode, such as being immersed underwater. The ability to temporarily seal the open battery cells of the instant invention protects the cathode compartment, and the ability to continue to deliver power—even after deactivation—provides a useful operating mode.

Employing ambient air as the source of molecular oxygen is a preferred embodiment of the present invention, though the use of alternative sources of oxygen are also within the scope of the invention. For instance, although oxygen storage is costly and volumetrically quite cumbersome, in certain circumstances these disadvantages are outweighed by the requirements of the application; for example, an operating environment lacking sufficient oxygen partial pressure. In an alternative embodiment to that depicted in FIG. 1, the cathode compartment 120 may be closed off from the ambient environment by being fully sealed in a battery casing. In this embodiment, molecular oxygen may be stored inside the cathode compartment, for example as dissolved oxygen in the catholyte. It may also be stored externally, in an oxygen container such as an oxygen tank, and plumbed into the cathode compartment.

The alternative embodiments for storing molecular oxygen, thus described, each has their own particular advantage. Open to air battery cells that access molecular oxygen from ambient air have an unlimited supply of oxygen without the constraint of storage. Placing open to ambient cells in a closed vessel allows for precise control of the ambient environment. Fully sealed battery cells have the advantage of self-containment. It is within the boundaries of this invention that the battery cell may be constructed or operated in any manner that is consistent with these embodiments, including a combination of them.

Referring back to FIG. 1, the alkali metal anode (also referred to simply as the anode) 102 comprises an alkali metal (e.g., Li, Na, K). Preferably it is Li. The alkali metal anode is generally an alkali metal such as lithium metal or sodium metal. The alkali metal anode may also be a metal alloy comprising the alkali metal and at least one other metal. Metals that alloy with alkali metals and are useful to form alkali metal anodes include Ca, Mg, Sn, Ag, Zn, Bi, Al, Cd, Ga, In, Cu. The alloys may include any number of alloying metals; typically the alkali metal alloys are binary or ternary alloys. In one particular embodiment the alkali metal anode comprises Li, Cu and Sn. Preferred alloys for alkali metal anodes include lithium aluminum alloys, lithium silicon alloys, lithium tin alloys, lithium silver alloys, and sodium lead alloys (e.g., $Na_4Pb$). In a further alternative form, the alkali metal of the alkali metal anode may be incorporated in an intercalation material whereby the alkali metal is the intercalating/deintercalating ion (e.g., $LiC_x$). Carbon materials commonly used in conventional Li-ion cells, in particular petroleum coke and mesocarbon microbead carbons, can be used as the intercalation host material for anodes in accordance with the instant invention.

Referring back to FIG. 1, oxygen is reduced at the oxygen electrode 112 during discharge and during charge products of discharge (e.g., lithium oxide) are re-oxidized. The oxygen electrode 112 includes an electronically conductive component (for example, a porous electronic conductor) and an ionically conductive component, generally catholyte. It also comprises molecular oxygen, at least during discharge, as the electrochemically active component. The oxygen electrode may be any suitable air electrode, including those conventionally used in metal (e.g., Zn)/air batteries, PEM fuel cells and phosphoric acid fuel cells. Air electrodes used in metal/air batteries, in particular in Zn/air batteries, are described in many sources including "Handbook of Batteries" (Linden and T. B. Reddy, McGraw-Hill, N.Y., Third Edition (2001)) and are usually composed of several layers including a hydrophobic Teflon layer, a catalyst layer, and a metal electronically conductive component/current collector, such as a Ni screen. The hydrophobic layer inhibits penetration of the cell's electrolyte into the gas diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most commercial air electrodes. Alternative catalysts include metal macrocycles such as cobalt phthalocyanine, iron phthalocyanine, other phthalocyanines (e.g., Mn, Cu) and highly dispersed precious metals such as platinum and platinum/ruthenium alloys. Since the oxygen electrode is chemically isolated from the alkali metal electrode (anode), the chemical composition of the oxygen electrode is not constrained by potential reactivity with the anode. This can allow for the design of higher performance oxygen electrodes using materials that would normally attack unprotected metal electrodes (e.g., an unprotected lithium anode).

Catholyte present in the oxygen electrode, generally in its pores and on its surface, provides an ionically conductive media for transporting alkali metal ions. Optimizing the disposition of the catholyte in the oxygen electrode is complicated, in part, by the complexity of the pore structure. Generally, the oxygen electrode may be in flooded or wetted configuration with respect to the catholyte. In a flooded configuration the pores of the oxygen electrode are entirely or at least mostly filled with catholyte. This configuration essentially floods the oxygen electrode and is particularly useful for battery cells whereby molecular oxygen is stored in the catholyte, or the battery cell is to be used in a low power application. While the invention is not limited to any particular theory of operation, in a flooded cathode configuration molecular oxygen must move through catholyte present in the pores in order to reach the catalytic surface of the oxygen electrode where it undergoes electrochemical reduction. In embodiments with a flooded configuration, the catholyte should be optimized for transport and concentration of oxygen. In other embodiments, however, a flooded cathode configuration is disadvantageous as it blocks air from freely flowing into and through the oxygen electrode. Generally, for alkali metal/air battery cells that access molecular oxygen from ambient air, the oxygen electrode preferably has a gas diffusion electrode structure, whereby catholyte wets rather than floods the electrode. A wetted cathode configuration provides transport of the alkali metal ion of the anode via catholyte that has wetted the surface of the electrode, while maintaining open porosity to facilitate flow of molecular oxygen.

Referring back to the cell depicted in FIG. 1, non-aqueous catholyte may also reside at least partially in a reservoir layer 114 disposed between the protective membrane architecture 104 and the oxygen electrode 112, in direct contact with the oxygen electrode. The reservoir layer 114 should be porous enough to preserve through porosity in order to maintain facile alkali metal ion transport despite the formation and accommodation of solid discharge product in the pores. While the invention is not limited to any particular theory of operation, the porous reservoir layer may provide a fresh supply of catholyte for rewetting the cathode structure or refilling the cathode pores while providing space for discharge products over the course of the cell's operation. The battery cells of the instant invention generate products of discharge that are very strong chemical oxidizers, such as peroxide compounds (e.g., $Li_2O_2$), the reactivity of which mandates that the material of the reservoir layer have excellent chemical durability. Most polymers, generally regarded as chemically inert, are inadequate in this regard as they are attacked by peroxide. Accordingly, the material of the reservoir layer is preferably a fully oxidized material, such as a fully oxidized metal oxide or semi-metal oxide; for example, porous zirconia.

The physical structure of the reservoir layer, in terms of its thickness and porosity, is dependent on the battery cell's application. The reservoir layers are generally very porous in order to contain as much catholyte as possible and to avoid clogging the through porosity with discharge product. Ideally the porosity of the reservoir layer is as high as possible while still maintaining structural integrity. The porous reservoirs should have through porosity that is in excess of 50% by volume and can be as high as 99.5%. More preferably the porosity is in the range of about 80% to 98% open. Reservoir layers suitable for use in primary batteries of the instant invention should be greater than 50 microns thick; more preferably greater than 100 microns thick; and even more preferably greater than 200 microns. Reservoir layers suitable for use in secondary batteries of the instant invention should be in the range of about 10 to 100 microns thick, and more preferably in the range of about 25 to 50 microns.

In an alternative embodiment, the reservoir layer may not be a discrete component of the battery cell but rather a constituent of the cathode structure. For example, the cathode structure may be materially graded across its thickness with the side adjacent to the anode being a fully oxidized material that provides a reservoir layer in which catholyte resides and accommodates products of discharge.

Due to the electronic isolation provided by the protected anode, the cathode 112 may be in direct contact with the surface of the protective membrane architecture opposite the anode. In such embodiments the membrane architecture provides the needed electronic isolation between the cathode and the alkali metal anode. Optionally, a porous reservoir layer may be disposed between the cathode structure and the anode. A further option is to place a separator material (not shown) against the protective membrane architecture to provide improved separation and as a way to protect the surface of the membrane architecture against mechanical abrasion by the cathode structure or porous reservoir layer. Suitable separator materials are electronically insulating and have a pore structure capable of containing catholyte in order to facilitate transport of the alkali metal ion of the anode through the cell. The separator is generally a porous material such as a microporous plastic film such as Celgard 2400 or a polymer alkali metal ion conducting gel electrolyte, well known to those of skill in the art of Li-ion batteries.

Referring back to FIG. 1, the protective membrane architecture 104 on the first surface of the alkali metal anode 102 selectively transports the alkali metal ion of the anode into and out of the cathode compartment while providing an impervious barrier to the environment of the cathode compartment. Protective membrane architectures suitable for use in the present invention are described in Applicants' co-pending published US Applications US 2004/0197641 (now U.S. Pat. No. 7,645,543, issued Jan. 12, 2010) and US 2005/0175894 (now U.S. Pat. No. 7,282,295, issued Oct. 16, 2007) and their corresponding International Patent Applications WO 2005/038953 and WO 2005/083829, respectively, incorporated by reference herein.

FIGS. 2A-D illustrate representative protective membrane architectures from these disclosures suitable for use in the present invention. The low equivalent weight of alkali metals, such as lithium, render them particularly attractive as a battery electrode component. However, metals such as lithium or sodium or compounds incorporating lithium with a potential near that (e.g., within about a volt) of lithium metal, such as lithium alloy and lithium-ion (lithium intercalation) anode materials, are highly reactive to many potentially attractive electrolytes and cathode materials. The protective membrane architectures provide a barrier to isolate alkali metal anodes including alkali metals (e.g., lithium metal) alkali metal alloys (e.g., lithium-aluminum alloy) or alkali metal ion intercalation compounds (e.g., $LiC_x$) from ambient and/or the cathode side of the cell while allowing for efficient alkali metal ion transport from the alkali metal anode to the cathode compartment and vice versa. The architecture may take on several forms. Generally it comprises a solid electrolyte layer that is substantially impervious, ionically conductive and chemically compatible with the external ambient (e.g., air or water) or the cathode environment.

Figure 2A:
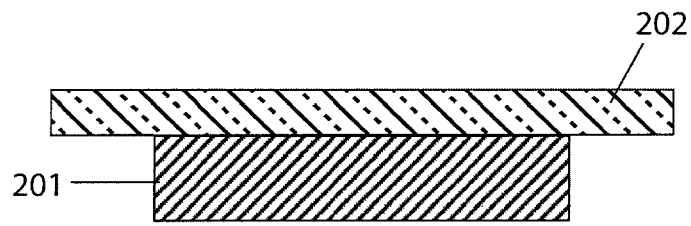
FIGS. 2A-D illustrate various alternative configurations of a protective membrane architecture in accordance with the present invention.

Referring to FIG. 2A, the protective membrane architecture can be a monolithic solid electrolyte 202 that provides ionic transport and is chemically stable to both the alkali metal anode 201 and the cathode environment, such as components of the cathode compartment. Examples of such materials are Na-β" alumina, $LiHfPO_4$ and NASICON, Nasiglass, $Li_5La_3Ta_2O_{12}$, $Li_5La_3Nb_2O_{12}$ and $Na_5MSi_4O_{12}$ (M: rare earth such as Nd, Dy, Gd,).

More commonly, the protective membrane architecture is a composite composed of at least two components of different materials having different chemical compatibility requirements, one chemically compatible with the anode, the other chemically compatible with the cathode environment; generally ambient air, and/or battery catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode environment and ambient conditions encountered in battery manufacturing. The composite is capable of protecting an alkali metal anode from deleterious reaction with other battery components or ambient conditions while providing a high level of ionic conductivity to facilitate manufacture and/or enhance performance of a battery cell in which the composite is incorporated.

Figure 2B:
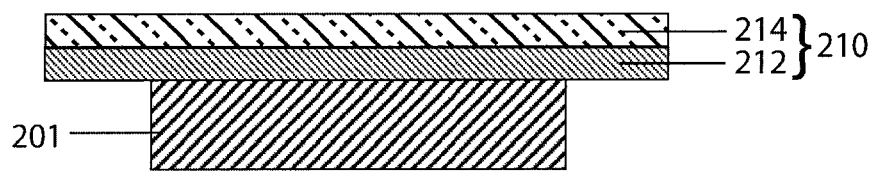
Figure 2C:
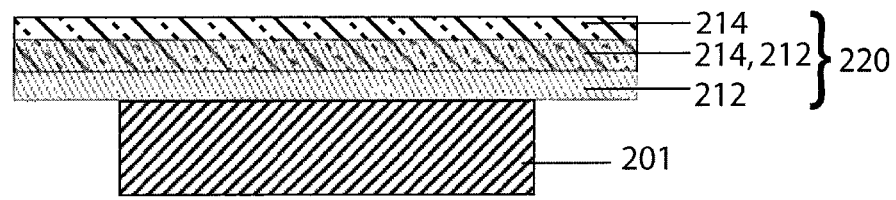

Referring to FIG. 2B, the protective membrane architecture can be a composite solid electrolyte 210 composed of discrete layers, whereby the first material layer 212 is stable to the alkali metal anode 201 and the second material layer 214 is stable to the external environment. Alternatively, referring to FIG. 2C, the protective membrane architecture can be a composite solid electrolyte 220 composed of the same materials, but with a graded transition between the materials rather than discrete layers.

Generally, the solid state composite protective membrane architectures (described with reference to FIGS. 2B and C) have a first and second material layer. The first material layer (or first layer material) of the composite is ionically conductive, and chemically compatible with an alkali metal anode. Chemical compatibility in this aspect of the invention refers both to a material that is chemically stable and therefore substantially unreactive when contacted with an alkali metal anode. It may also refer to a material that is chemically stable with air, to facilitate storage and handling, and reactive when contacted with an alkali metal anode to produce a product that is chemically stable against the alkali metal anode and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm$^2$ and as high as $10^{-3}$ S/cm or higher.

Figure 2D:
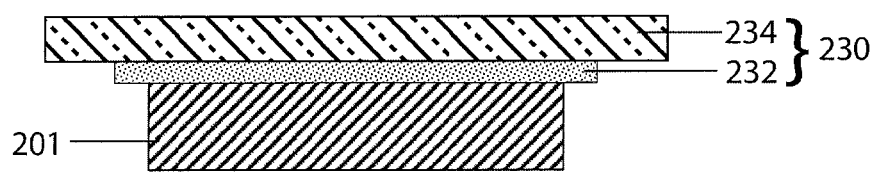

A fourth suitable protective membrane architecture is illustrated in FIG. 2D. This architecture is a composite 230 composed of an interlayer 232 between the solid electrolyte 234 and the alkali metal anode 201 whereby the interlayer is impregnated with anolyte. Thus, the architecture includes an alkali metal ion conducting separator layer with a non-aqueous anolyte (i.e., electrolyte about the anode), the separator layer being chemically compatible with the alkali metal anode and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 2D) generally shares the properties of the second material layer for the composite solid state architectures (FIGS. 2B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of FIGS. B and C, the first layer (material component), in contact with the alkali metal anode, may be composed, in whole or in part, of alkali metal nitrides, alkali metal phosphides, alkali metal halides alkali metal sulfides, alkali metal phosphorous sulfides, or alkali metal phosphorus oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Alkali metal anodes (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is $Cu_3N$. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention. In this regard, the composite conversion product of $Cu_3N$ with Li is one particularly preferred embodiment of a first layer material in accordance with this aspect of the invention.

For the anolyte interlayer composite protective architecture embodiment (FIG. 2D), the protective membrane architecture has an alkali metal ion conducting separator layer chemically compatible with the alkali metal anode and in contact with the anode, the separator layer comprising a non-aqueous anolyte, and a substantially impervious, ionically conductive layer ("second" layer) in contact with the separator layer, and chemically compatible with the separator layer and with the exterior of the anode compartment. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will also, of course, also include alkali metal salts, such as, in the case of lithium, for example, $LiPF_6$, $LiBF_4$, $LiAsF_6$, $LiSO_3CF_3LiN(CF_3SO_2)_2$ or $LiN(SO_2C_2F_5)_2$. In the case of sodium suitable anolytes will include alkali metal salts such as $NaClO_4$, $NaPF_6$, $NaAsF_6NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed, in whole or in part, of a material that is substantially impervious, ionically conductive and chemically compatible with the first material or precursor, including glassy or amorphous metal ion conductors, polycrystalline ion conductors, and glass ceramic ion conductors such as phosphorous based glass, oxide-based glass, oxide sulfide based glass, selenide based glass, gallium based glass, germanium-based glass, Nasiglass; ceramic alkali metal ion conductors, such as lithium beta-alumina, sodium beta-alumina, Li superionic conductor (LISICON) such as lithium metal phosphates (e.g., $LiTi_2(PO_4)_3$, $LiGe_2(PO_4)_3$, $Li_{1+x+r}(Ti_{2-y}Ge_y)_{2-x}(Al_{2-z}Ga_z)_xSi_rP_{3-r}O_{12}$ wherein $(0.0 \le x \le 0.9)$ and $(0.0 \le y \le 2.0)$ and $(0.0 \le z \le 2.0)$ and $(0.0 \le r \le 1.0)$,) Na superionic conductor (NASICON), and the like; or glass-ceramic alkali metal ion conductors. Specific examples include, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ $(0.0 \le x \le 0.9)$ and crystallographically related structures, $Li_{1+x}Hf_{2-x}Al_x(PO_4)_3$ $(0.1 \le x \le 0.9)$, $LiGe_2(PO_4)_3$, $Li_2TiGe(PO_4)_3Li_2Ge_{2-x}Ti_x(PO_4)_3$ $(0.0 \le x \le 2.0)$, $Li_{1+x}Ge_{2-x}Al_x(PO_4)_3$ $(0.0 \le x \le 0.9)$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.7}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion alkali metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \le 0.8$ and $0 \le y \le 1.0$, and where M is an element selected from the group consisting of Nd, Sm, Eu, Gd, Tb, Dy, Ho, Er, Tm and Yb and/or $Li_{1+x+y}Q_xTi_{2-x}(Si_yP_{3-y}O_{12}$ where $0 \le X \le 0.4$ and $0 \le Y \le 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The composite should have an inherently high ionic conductivity. In general, the ionic conductivity of the composite is at least $10^{-6}$ S/cm generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the alkali metal anode. For example, the first material layer for the solid-state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 10 to 1000 microns, or, where the ionic conductivity of the second material layer is about $10^{-5}$ S/cm, about 10 to 50 micron, or, where the ionic conductivity of the second material layer is between about $10^{-5}$ and $10^{-4}$ S/cm, about 10 to 1000 microns, preferably between 10 and 500 microns, and more preferably between 10 and 100 microns, for example about 20 microns.

Referring back to FIG. 1, non-aqueous catholyte is a component of the cathode compartment 120. It is generally a liquid and provides an ionic transport media between the protective membrane architecture 104 and the oxygen electrode 112. The catholyte resides at least in the oxygen electrode and is in direct contact with the protective membrane architecture on the side opposite the anode. The catholyte may also reside, at least partially, in an optional separator or optional reservoir layer 114 disposed between the protective membrane architecture 104 and the oxygen electrode 112.

The catholyte comprises at least one non-aqueous solvent. It also typically comprises an electrolyte salt. Electrolyte salts that are suitable for use in the catholyte include a variety of alkali metal (M=Li, Na, K) cation salts where M is the alkali metal of the anode including $MBF_4$, $MPF_6$, $MAsF_6$, MBr, $MSO_3CF_3 MN(CF_3SO_2)_2$ or $MN(SO_2C_2F_5)_2$. Preferred salts are MCL and $MN(CF_3SO_2)_2$ is particularly preferred. If moisture is expected to be present in the cathode compartment, either incidentally or intentionally, particular attention should be taken when choosing electrolyte salts to ensure that they do not react with moisture to form a byproduct that can attack the protective membrane, halt functionality of the cathode or create a safety hazard. For example, certain electrolyte salts such as $LiPF_6$ react with moisture in the catholyte to form HF—this may present both a safety hazard and materials instability issue, depending on battery use and application. Accordingly, for certain embodiments of the alkali metal/air battery cells of the instant invention, the catholyte salts are selected to minimize the formation of HF to levels that are no greater than 20 ppm; more preferably less than 10 ppm; and even more preferably less than 2 ppm. Particularly preferred salts for use in open to air Li/Air battery cells of the present invention are LiCl and $LiN(CF_3SO_2)_2$, for example $LiN(CF_3SO_2)_2$.

Protected anode battery structures, in accordance with the present invention, effectively de-couple the cathode compartment from the alkali metal anode. This allows optimization of catholyte formulation for compatibility with and performance of the oxygen electrode, without interference from the anode. As a result, the inventors have been able to discover solvents and solvent mixtures that vastly enhance the performance of the performance of non-aqueous lithium-oxygen battery cells. The ability to choose and to employ catholyte solvents without consideration of its affect on the anode is a tremendous advantage in the practical realization of non-aqueous alkali metal/oxygen battery cells (e.g., non-aqueous Li/Air). Solvents suitable for use in the battery cells of the present invention should be chemically compatible with the surface of the protective membrane architecture in contact with the catholyte and compatible with the oxygen electrode, but are not required to be compatible with the alkali metal anode. Accordingly, this affords wide latitude in the choice of suitable catholyte solvents. Furthermore, the solvents may be selected and used in the catholyte to any volumetric proportion and in combination with any other solvent or electrolyte salt without consideration of the effect that its proportion or combination will have on the anode. Suitable solvents include aprotic solvents, protic non-aqueous solvents, donor solvents and acceptor solvents, as well as other solvents that are generally considered incompatible or compatible with the alkali metal anode, and combinations thereof. Moreover, water may also be added to the catholyte intentionally as a cathode performance enhancing additive or as a means to pre-condition components of the cathode compartment to moisture prior to cell activation.

While it is well recognized that protic non-aqueous solvents are corrosive to alkali metals due to reactive hydrogen, there is no theoretical mechanism to generally predict aprotic solvent reactivity with alkali metals. For example, acetonitrile is a very common aprotic solvent with a wide voltage stability window that would suggest thermodynamic stability even against lithium metal. Yet, acetonitrile (in the absence of $SO_2$) rapidly attacks and corrodes bare lithium metal producing methane and LiCN. In fact, conventional unprotected alkali metal electrodes, such as bare lithium metal electrodes, are inherently unstable in virtually all known solvent systems. It is only in some cases that the alkali metal surface in contact with the non-aqueous solvent or electrolyte comprising the solvent forms a protective SEI as a result of reaction between the solvent and the metal surface, inhibiting further reaction. These solvents (referred to as anode compatible solvents) find use in conventional lithium metal and lithium ion batteries. Despite the kinetic stability of these solvents or electrolyte formulations comprising these solvents, alkali metal anodes passivated in this way are still susceptible to chemical attack if the chemical composition of the electrolyte is altered in anyway; for instance, if an additional organic solvent is added to the electrolyte, or if the solvent is contaminated by water. As a consequence there is limited latitude for choosing suitable electrolyte solvents that can be used to improve oxygen electrode performance, since most solvents are incompatible with alkali metal anodes (e.g., Li anodes), and even those solvents that are compatible are still limited when used against unprotected alkali metal anodes in terms of their useful proportion in the electrolyte. Without adequate protection of the anode, the choice of possible electrolytes and the ability to optimize their formulation for cathode performance is restricted to mixing and matching of a handful of anode compatible solvents and salts.

The situation is very different for the protected anode battery cells of the present invention, as the protective membrane architecture provides wide latitude not only in terms of the type of solvents and salts that can be used, but also to their relative proportion in the catholyte. Accordingly, the following solvents, which are generally considered to be compatible with alkali metal anodes (e.g., Li anodes), are not only suitable for use in catholytes of battery cells of the present invention, they can be used in combination with any other salt or solvent and in any relative proportion that provides benefit to the cathode, as they have no direct impact on the anode. Examples of anode compatible solvents include ethers (e.g., 2-Methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/mono-glyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), and butyrolactone (GBL).

Most solvents, are incompatible with alkali metal, and cannot be used in conventional lithium batteries. These solvents do not form an SEI and in contact with alkali metal anodes continuously react and degrade the anode surface. Protic non-aqueous solvents such as diols and alcohols are strong hydrogen bond donors, and readily attack alkali metals as follows:

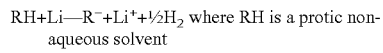

$RH + Li \rightarrow R^- + Li^+ + \frac{1}{2}H_2$ where RH is a protic non-aqueous solvent Other solvents that are incompatible with alkali metals include those falling into the family of amides, amines, nitriles, organosulfur solvents, and organophosphorous solvents. Due to effective de-coupling of the anode from the catholyte by the protective membrane architecture, non-aqueous catholyte solvents that adversely react with alkali metal and degrade its surface including such solvents that aggressively corrode alkali metal are suitable for the batteries of the instant invention. Anode incompatible solvents suitable for batteries of the instant invention generally encompass all non-aqueous protic and most aprotic solvents. Moreover, these solvents may be used in the catholyte to any proportion and combination thereof with any other non-aqueous protic or aprotic solvent.

Examples of anode-incompatible non-aqueous protic solvents suitable for catholytes of the present invention include alcohols (ethanol, methanol, propanol, butanol, methoxyethanol), diols (e.g., ethylene glycol, ethanediol, propanediol) and liquid polyols containing multiple hydroxyl groups. Preferred protic solvents are diols, particularly EG.

Examples of anode incompatible aprotic solvents suitable for catholytes of the present invention include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N'tetraethylsulfamide, tetramethylurea (TMU), 2-pyrrolidone, N-methylpyrrolidone, N-methylpyrrolidinone), amines (e.g., butylamine, ehtylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, organophosphorous solvent (e.g., tributylphosphate, trimethylphosphate, hexamethylphosphoramide (HMPA)).

Because of their low volatility and solubility for polymeric binders and polymer host compounds, a number of anode incompatible non-aqueous solvents may be employed in the preparation of battery components, such as cathode films, carbon coatings and gel and polymer electrolytes. During preparation of these battery components, anode incompatible solvents may be used as a liquid phase component for dissolving binder or polymer hosts into a slurry that is then coated or cast as a film or coating. The anode incompatible solvent is evaporated off during the coating/casting process, and if appropriate can even be flash evaporated at elevated temperature, prior to battery cell assembly. However, as a result of the use of Li-incompatible solvents for battery cell component preparation, it is not uncommon for trace amounts of the solvent to end up as an impurity in the battery cell electrolyte. The presence of anode incompatible solvents as an impurity is starkly in contrast with their use and functionality as described herein whereby their presence in the catholyte represents a significant constituent of the catholyte and provides actual positive benefit to battery cell performance. Accordingly, anode incompatible solvents in catholytes of the instant invention are present in the catholyte beyond minute levels such as that of a mere impurity. Generally, anode incompatible solvents (both non-aqueous protic and aprotic) are present in the catholyte at levels greater than that considered to be an impurity. Preferably the solvents are incorporated in the catholyte formulation to levels that are at least 5% by volume, more preferably at least 10%, and even more preferably in excess of 20% by volume. In some embodiments, these incompatible solvents are present in the catholyte in excess of 50% by volume.

Moreover, it has been found that battery cell performance is improved significantly by incorporating a non-aqueous solvent in the catholyte having a high donor number (DN) and/or a high acceptor number (AN) at concentrations in the catholyte that are at least 5% by volume, more preferably at least 10% and even more preferably at least 20% by volume in the catholyte. Donor and acceptor numbers are figures of merit that correspond to the ability of the solvent to coordinate cations (DN) and anions (AN). While the invention is not limited to any particular theory of operation, donor solvents tend to solubilize cations while acceptor solvents solubilize anions, and it may be that their propensity to coordinate, ionize or more generally interact with the lithium oxide discharge product is the origin of the significant performance benefit. Accordingly, a further desirable property of both the donor and acceptor solvents used in this invention is a high dielectric constant. Such solvents generally promote dissociation of an ionic solute or a contact ion-pair.

Most high donor number and high acceptor number solvents are incompatible with and in some instances aggressively corrode unprotected lithium anodes (e.g., bare lithium metal), but as described above can be employed in battery cells whereby the anode is not in direct contact with the catholyte solvent, such as the protected anode battery structures comprising protective membrane architectures as described throughout the specification.

Generally donor solvents are those solvents that can be characterized as Lewis bases (they may be aprotic solvents). Generally, these solvents are good at solvating cations such as lithium ions. Donor solvents promote the ionization of covalent compounds to form intimate (or contact) ion-pairs. The concept of a solvent donor number is further explained and exemplified in "Experimental Electrochemistry, for Chemists," by Sawyer and Roberts, Jr., John Wiley & Sons, New York (1995), incorporated herein by reference for all purposes. Examples of suitable non-aqueous donor solvents include hexamethylphosphoramide (HMPA), pyridine, N,N-diethylacetamide, N,N-diethylformamide, dimethylsulfoxide (DMSO), tetramethylurea (TMU), N,N-dimethylacetamide (DMAC), N,N-dimethylformamide (DMF), tributylphosphate, trimethylphosphate, N,N,N',N'-tetraethylsulfamide, tetraethylenediamine, tetramethylpropylenediamine, & pentamethyldiethylenetriamine. Donor solvents assist in salvation of lithium ions. Preferred donor solvents have a donor number of at least 15, more preferably between about 15 and 40 and most preferably between about 18-40. Preferred non-aqueous donor solvents include N,N-dimethylformamide (DMF), dimethylsulfoxide (DMSO), Acetonitrile (AN) and N,N-dimethylacetamide (DMAC). A particularly preferred donor solvent is DMF.

Acceptor solvents are those solvents which can be characterized as Lewis acids (they may be protic or aprotic solvents)

and promote salvation of anions. Examples of non-aqueous acceptor solvents suitable for use in catholytes of the present invention include alcohols such as methanol, diols such as ethylene glycol and polyols as well as nitromethane, triflouroacetic acide, trifluoromethanesulfonic acid, sulfur dioxide and boron triflouride. Preferred non-aqueous acceptor solvents are diols, for examples ethylene glycol (EG).

It has also been found that the combination of both a high donor number and a high acceptor number solvent in the catholyte provides a synergistic effect on the performance of the oxygen electrode and more generally on the overall performance of the battery cell. When both donor and acceptor solvents are present in the electrolyte, the volumetric ratio of the donor to acceptor solvent typically ranges from about 10:1 to 1:10, more preferably the ratio is about 5:1 to 1:5, and even more preferably the ratio is about 3:1 to 1:3. In a specific embodiment, the acceptor to donor solvent ratio is about 1:2. In one embodiment, the acceptor solvent is present in the catholyte to about 65% by volume. In one embodiment the donor solvent is present in the catholyte to about 35% by volume. In another embodiment, the ratio of donor to acceptor solvent is about 1:1. In another embodiment, a donor solvent and an acceptor solvent are each present in the catholyte at about 50% by volume. A preferred donor solvent is N,N-dimethylformamide (DMF) and a preferred acceptor solvent is ethylene glycol (EG).

Further details relating to cell components, cell fabrication and performance of alkali metal/oxygen battery cells, specifically non-aqueous Li/Air battery cells is provided as follows.

EXAMPLES

The following examples provide details illustrating advantageous properties and performance of alkali metal/oxygen batteries having a protective membrane architecture and non-aqueous catholyte in accordance with the present invention. These examples are provided to exemplify and more clearly illustrate aspects and advantages of the present invention and are in no way intended to be limiting.

Example 1

Discharge of a Li/Air Battery Cell Having a Protected Anode and a Non-Aqueous Catholyte Comprising Acetonitrile Solvent A non-aqueous Li/Air cell was assembled with a protected Li anode and a cathode compartment. The cell assembly and preparation of all non-aqueous electrolytes was carried out in a glove box filled with dry argon. The protected anode comprised Li foil with a thickness of 1 mm received from FMC Lithium Corporation. A disc-shaped Li foil having a diameter of ½ inch was pressed onto a Ni gauze current collector in a controlled atmosphere dry room with a dew point of less than −40° C. The protective membrane architecture included a polymeric microporous separator (Celgard 2400) as the first component material impregnated with a non-aqueous electrolyte (anolyte) and a glass ceramic membrane as the impervious second component material. Specifically, the first component material was a disc of Celgard 2400 microporous separator with a diameter of 9/16 inch and a thickness of 25 μm was placed onto the Li foil and filled with 0.1 ml of non-aqueous electrolyte (anolyte) comprising 1 M of LiN$(CF_3SO_2)_2$ dissolved in a mixture (1:1 by volume) of 1,2 DME and Dioxolane. The second component material was an impervious Li ion conductive glass-ceramic membrane (AG-01 material from OHARA Corporation) which had dimensions of 1 inch by 1 inch square with a thickness of 150 μm and separated the Li anode from the non-aqueous catholyte. The catholyte contained 0.5 M of LiBr dissolved in acetonitrile. A disc of zirconia felt ZYF-150 with a diameter of 7/16 inch and a thickness of 3.8 mm acted as a reservoir layer for catholyte and was placed between the glass-ceramic membrane and the air electrode (oxygen electrode). The pores of the felt (total porosity over 94%) were filled with 0.45 ml of catholyte. The edges of the glass-ceramic membrane were sealed against the catholyte by means of a Kalrez O-ring. A gas diffusion electrode LT 140-E with Pt-catalyzed surface from E-TEK Corporation was used as an air electrode (oxygen electrode). The cathode compartment was sealed with an EPDM O-ring and a PTFE gas-diffusion membrane having Gurley number of approximately 700 seconds. As a result, gas and moisture exchange between the compartment and outside environment occurred only through the gas-diffusion membrane. Discharge experiments were performed at constant current in ambient laboratory atmosphere at room temperature.

Figure 3:
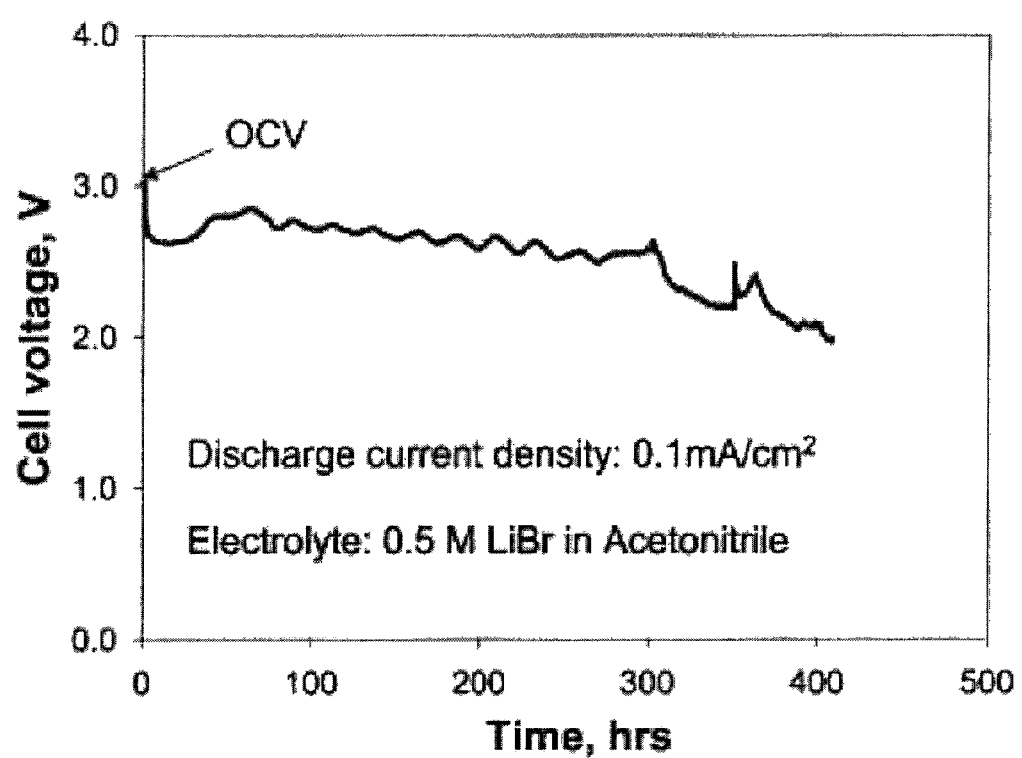
FIG. 3 depicts a plot of the discharge curve of a Li/Air battery cell of the test cell in Example 1.

FIG. 3 depicts a plot of the discharge curve of the Li/Air battery test cell. The OCV of the Li/Air cell was observed to be slightly over 3.0 volts. At a discharge current density of 0.1 mA/cm$^2$, the cell exhibited a long discharge of over 400 hours with an average discharge voltage of approximately 2.6 V. Oscillations seen in the discharge curve were caused by day-night variations in the cell's temperature, which tracked the ambient room temperature. Post-mortem analysis of the cell showed that the duration of discharge was limited by evaporation of acetonitrile from the cathode compartment. This example demonstrates that non-aqueous solvents known to be very reactive towards lithium metal can be used successfully in Li/Air cells employing protective membranes, as evidenced by a long stable discharge curve.

Example 2

Properties of Non-Aqueous Electrolytes Based on Binary Solvent System Dimethylformamide-Ethylene Glycol A search for non-aqueous electrolytes that are able to enhance the discharge capacity of Li/Air cells for moderate rates of discharge led to discovery of an electrolyte system based on solvent mixtures in the binary system dimethylformamide-ethyleneglycol. We found that non-aqueous electrolytes based on such mixtures demonstrate very attractive properties in Li/Air cells.

Non-aqueous electrolytes were prepared in a glove box filled with dry argon. Moisture content in the prepared electrolytes did not exceed 50 ppm. Wettability experiments were performed using individual dimethylformamide and ethyleneglycol solvents and also electrolytes containing LiCl and LiN$(CF_3SO_2)_2$ supporting salts dissolved in dimethylformamide-ethyleneglycol mixtures. Two types of air electrodes (oxygen electrodes) were used in these experiments. The first type of air electrode was a gas diffusion electrode LT 140-E from E-TEK Corp. The second type of air electrode was a standard carbon-based electrode developed for Zn/Air batteries with alkaline aqueous electrolytes; this electrode employed a Ni screen current collector and a PTFE layer bonded to the outer surface in contact with atmospheric air. It was found that the front surfaces (which face the electrolyte in the Li/Air cells) of both types of the air electrodes were well wetted by the individual solvents, their mixtures and by the electrolytes employing the solvent mixtures. At the same time, all the above-mentioned liquids used in the test did not flow through (flood) the air electrodes, so the electrodes could operate in a gas-diffusion mode, wherein the pores on the outer surfaces of the electrodes contained only the gas phase and did not contain the liquid phase.

Conductivity of non-aqueous electrolytes containing LiCl and LIN($CF_3SO_2$)$_2$ supporting salts dissolved in dimethylformamide-ethyleneglycol mixtures was measured using conductivity cell XE-100 from Radiometer Copenhagen Company. The observed values of specific conductivity varied from approximately 15-20 mS/cm for electrolytes employing individual dimethylformamide to a few mS/cm for electrolytes employing large fractions of ethyleneglycol. These conductivity values are sufficient for Li/Air cells discharging at moderate current rates.

Example 3

Demonstration of Discharge Performance of Li/Air Cells Employing Non-Aqueous Catholytes Based on Solvent Mixtures of Dimethylformamide (DMF) and Ethylene Glycol (EG)

Li/Air cells were fabricated similar to the cell used in example 1. The protected anode employed Li foil with a thickness of 1 mm on a Ni gauze current collector, a disc of Celgard 2400 separator filled with 0.1 ml of non-aqueous anolyte comprising 1 M of LIN($CF_3SO_2$)$_2$ dissolved in the mixture (1:1 by volume) of 1,2 DME and Dioxolane, and a protective glass-ceramic membrane (AG-01 material) with a thickness of 150 μm. A disc of zirconia felt ZYF-150 with a diameter of ½ inch and a thickness of 3.8 mm acting as a catholyte reservoir was placed between the glass-ceramic membrane and the air cathode and was filled with 0.6 ml of catholyte. A gas diffusion electrode LT 140-E from E-TEK Corporation was used as an air cathode. Methods of sealing the edges of the glass-ceramic membrane and the cathode compartment were the same as those described in Example 1. The non-aqueous electrolytes comprised 0.5 M of LiN($CF_3SO_2$)$_2$ supporting salt dissolved in dimethylformamide (composition 1); in ethylene glycol (composition 2); in 1:1 mixture by volume of dimethylformamide and ethylene glycol (composition 3); and in 2:1 mixture by volume of dimethylformamide and ethylene glycol (composition 4). The Li/Air cells were placed into an environmental chamber with controlled humidity and temperature. During discharge experiments the temperature was kept at 25° C. and the relative humidity at 50%.

Figure 4:
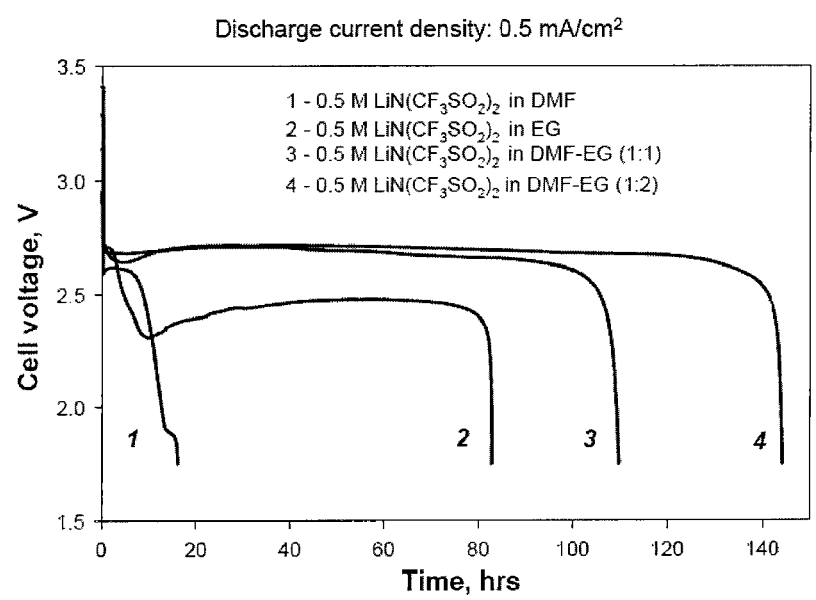
FIG. 4 depicts a plot of discharge curves of Li/Air battery cells described in Example 3.

FIG. 4 depicts a plot of discharge curves of Li/Air battery cells described in this example. The Li/Air cells employing catholytes based on dimethylformamide and ethylene glycol mixtures (compositions 3 and 4) delivered significantly greater discharge capacities than the cells employing catholyte compositions 1 and 2. In particular, at 0.5 mA/cm$^2$ the Li/Air cell employing the catholyte comprising a 2:1 mixture of dimethylformamide and ethylene glycol (composition 4) delivered a capacity of 72 mAh/cm$^2$, which corresponds to approximately 350 μm of Li metal discharged across the protective glass-ceramic membrane into the cathode compartment. Notably, the cells with mixtures of dimethylformamide and ethylene glycol exhibited very flat discharge curves with an average voltage of approximately 2.7 volts.

These experiments demonstrate that the combination of dimethylformamide and ethylene glycol enhances discharge performance of air cathodes in non-aqueous media. The solvent mixtures containing dimethylformamide and ethylene glycol can be used successfully in Li/Air cells with protected Li anodes.

Example 4

Cycling Performance of Li/Air Cells Employing Catholytes Based on Mixtures of Dimethylformamide and Ethylene Glycol Li/Air cells were fabricated as described in example 2; the only differences were in the components of the cathode compartment. A disc of zirconia cloth ZYK-15 with a diameter of ½ inch acting as a catholyte reservoir was placed between the glass-ceramic membrane and the air cathode and filled with 0.125 ml of catholyte comprising 0.5 M of LiN($CF_3SO_2$)$_2$ supporting salt dissolved in 1:1 mixture by volume of dimethylformamide and ethylene glycol. The above-described second type of air electrodes developed for Zn/Air batteries with alkaline aqueous electrolyte was used as an air cathode in this experiment. During cycling experiments the cell temperature was kept at 25° C. and the relative humidity at 50%.

Figure 5:
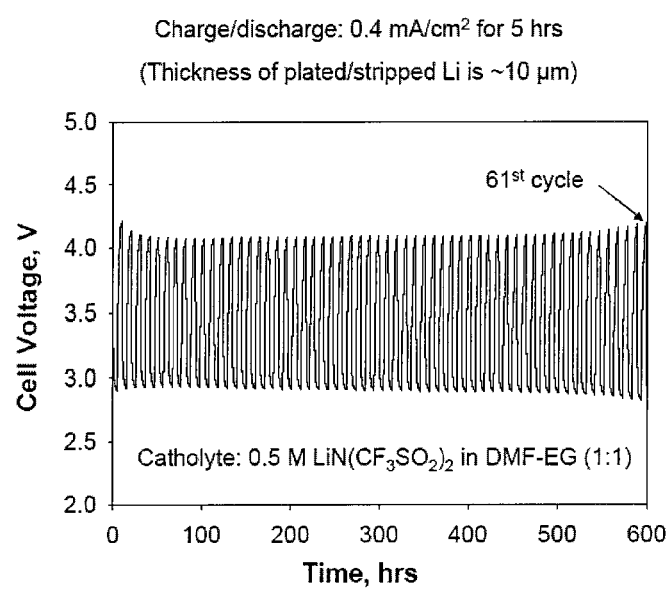
FIG. 5 depicts a plot of cycling voltage profiles of a rechargeable Li/Air battery cell described in Example 4.

Cycling was performed at charge/discharge current densities of 0.4 mA/cm$^2$ The duration of charge and discharge was 5 hours, corresponding to an amount of metal Li plated and stripped at each semicycle of almost 10 μm. FIG. 5 depicts a plot of cycling voltage profiles of the rechargeable Li/Air battery cell described in this example. The Li/Air cell employing the catholyte based on mixtures of dimethylformamide and ethylene glycol exhibited good cycleability. The cell delivered over sixty charge/discharge cycles with negligible increase in anode or cathode polarization. These experiments demonstrate that the chemistry of reactions in Li/Air cells employing catholytes based on mixtures of dimethylformamide and ethylene glycol is reversible and in combination with protected Li anode provides conditions for sustainable charge/discharge cycling.

CONCLUSION

Although the foregoing invention has been described in some detail for purposes of clarity of understanding, it will be apparent that certain changes and modifications may be practiced within the scope of the appended claims. In particular, while the invention is primarily described with reference to a lithium metal anode, the anode may also be composed of any alkali metal, in particular, other alkali metals, such as sodium. It should be noted that there are many alternative ways of implementing both the process and compositions of the present invention. Accordingly, the present embodiments are to be considered as illustrative and not restrictive, and the invention is not to be limited to the details given herein.

What is claimed:

1. A non-aqueous alkali metal/oxygen battery cell, comprising:
    a protected anode, comprising,
        an alkali metal anode having a first surface and a second surface,
        a protective membrane architecture on at least the first surface of the anode,
        a cathode compartment comprising an oxygen electrode, molecular oxygen, and a non-aqueous oxygen electrode-compatible catholyte comprising a first alkali metal anode-incompatible solvent, the first alkali metal anode-incompatible solvent in contact with and enhancing the performance of the oxygen electrode, the first alkali metal anode-incompatible solvent not in contact with the alkali metal anode, the first alkali metal anode-incompatible solvent selected from the group consisting of amides, amines, nitriles, organophosphorous solvents, organosulfur solvents, alcohols, diols and liquid polyols; and, wherein the protective membrane architecture comprises one or more materials configured to provide a first membrane surface chemically compatible with the alkali metal anode in contact with the anode, and a second membrane surface substantially impervious to and chemically compatible with the components of the cathode compartment; and further wherein the cell is configured for electrochemical reduction of the molecular oxygen on the surface or in the bulk of the oxygen electrode to produce lithium peroxide and electrochemical oxidation at the anode without contact between the alkali metal anode and the first alkali metal anode-incompatible solvent.

2. The battery cell of claim 1 wherein the oxygen electrode is exposed to ambient air and the molecular oxygen is accessed from the ambient air.

3. The battery cell of claim 2 wherein the protective membrane architecture comprises at least a first material component in contact with the anode and a second material component in contact with the components of the cathode compartment.

4. The battery cell of claim 3 wherein the second material component is substantially impervious.

5. The battery cell of claim 4 wherein the second material component is about 10 to 1000 microns thick.

6. The battery cell of claim 5 wherein the second material component has conductivity of at least $10^{-5}$ S/cm.

7. The battery cell of claim 6 wherein the second material component comprises a material selected from the group consisting of polycrystalline ceramics, glass ceramics and glass.

8. The battery cell of claim 7 wherein the second material component comprises a material selected from the group consisting of phosphorous based glass, oxide based glass, oxide sulfide based glass, selenide glass, gallium based glass, germanium based glass, sodium and lithium beta-alumina, glass ceramic alkali metal ion conductors, and Nasiglass.

9. The battery cell of claim 7 wherein the second material component comprises a polycrystalline ceramic selected from the group consisting of LISICON, NASICON, $Li_{0.3}La_{0.7}TiO_3$, sodium and lithium beta alumina.

10. The battery cell of claim 9 wherein the second component material comprises a LISICON polycrystalline ceramic selected from the group consisting of lithium metal phosphates.

11. The battery cell of claim 10 wherein the lithium metal phosphates have the formula $Li_{1+x+r}(Ti_{2-y}Ge_y)_{2-x}(Al_{2-z}Ga_z)_x Si_r P_{3-y}O_{12}$ wherein $(0.0 \leq x \leq 0.9)$ and $(0.0 \leq y \leq 2.0)$ and $(0.0 \leq z \leq 2.0)$ and $(0.0 \leq r \leq 1.0)$.

12. The battery cell of claim 10 wherein the second component is $LiTi_2(PO_4)_3$.

13. The battery cell of claim 7 wherein the glass ceramic is

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < x \leq 0.4$ and $0 < y \leq 0.6$, and where Q is Al or Ga.

14. The battery cell of claim 3 wherein the first material component is a separator layer comprising a semi-permeable membrane impregnated with anolyte.

15. The battery cell of claim 14 wherein the semi-permeable membrane is a microporous polymer.

16. The battery cell of claim 15 wherein the anolyte is in a liquid phase.

17. The battery cell of claim 16 wherein the anolyte is in a gel phase.

18. The battery cell of claim 16 wherein the first material component comprises LiPON.

19. The battery cell of claim 3 wherein the first material component comprises a material selected from the group consisting of a composite reaction product of alkali metal with $Cu_3N$, alkali metal nitrides, alkali metal phosphides, alkali metal halides, alkali metal phosphorus sulfide glass and alkali metal phosphorous oxynitride glass.

20. The battery cell of claim 19 wherein the first material component comprises a material selected from the group consisting of a composite reaction product of alkali metal with $Cu_3N$, $L_3N$, $Li_3P$, LiI, LiF, LiBr, LiCl and LiPON.

21. The battery cell of claim 20 wherein the alkali metal anode comprises lithium and the first material component comprises the composite reaction product of Li with $Cu_3N$.

22. The battery cell of claim 2 wherein the battery cell self discharge rate after battery activation is less than 0.01 $mA/cm^2$.

23. The battery cell of claim 2 wherein a moisture content of the non-aqueous catholyte is greater than 100 ppm.

24. The battery cell of 1 wherein the first alkali metal anode-incompatible solvent is present in the catholyte to at least 20% by solvent volume.

25. The battery cell of claim 24 wherein the first alkali metal anode-incompatible solvent is selected from the group consisting of N,N-dimethylformamide (DMF), N,N-dimethylacetamide (DMAC), dimethylsulfoxide (DMSO), hexamethylphosphoramide (HMPA), and acetonitrile (AN).

26. The battery cell of claim 25 wherein the first alkali metal anode-incompatible solvent is N,N-dimethylformamide (DMF).

27. The battery cell of claim 1 wherein the first alkali metal anode-incompatible solvent is a non-aqueous protic solvent.

28. The battery cell of claim 27 wherein the non-aqueous protic solvent is present in the catholyte to at least 20% by solvent volume of the catholyte.

29. The battery cell of claim 27 wherein the non-aqueous protic solvent is selected from the group consisting of alcohols, diols and liquid polyols.

30. The battery cell of claim 29 wherein the non-aqueous protic solvent is a diol.

31. The battery cell of claim 30 wherein the diol is ethylene glycol.

32. The battery cell of claim 1 wherein the non-aqueous catholyte comprises a non-aqueous donor solvent and a non-aqueous acceptor solvent.

33. The battery cell of claim 32 wherein the non-aqueous donor solvent is present in the catholyte to at least 20% by solvent volume of the catholyte.

34. The battery cell of claim 33 wherein the donor solvent is N,N-dimethylformamide (DMF).

35. The battery cell of claim 32 wherein the non-aqueous acceptor solvent is present in the catholyte to at least 20% by solvent volume of the catholyte.

36. The battery cell of claim 35 wherein the acceptor solvent is ethylene glycol.

37. The battery cell of claim 32 wherein the ratio of donor to acceptor solvent ratio is in the range of about 1 to 10 to about 10 to 1.

38. The battery cell of claim 37 wherein the donor solvent and the acceptor solvent are both present in the catholyte to about 50% by solvent volume of the catholyte.

39. The battery cell of claim 37 wherein the donor solvent is present in the catholyte to about 35% and the acceptor solvent is present in the catholyte to about 65% by solvent volume of the catholyte.

40. The battery cell of claim 39 wherein the acceptor solvent is ethylene glycol.

41. The battery cell of claim 40 wherein the donor solvent is N,N-dimethylformamide (DMF).

42. The battery cell of claim 1, wherein the non-aqueous catholyte further comprises a non-aqueous solvent that is compatible with the alkali metal anode.

43. The battery cell of claim 42 wherein the non-aqueous solvent that is compatible with the alkali metal anode is selected from the group consisting of ethers, glymes, carbonates, and g-butyrolactone (GBL).

44. The battery cell of claim 1 wherein the cathode compartment further comprises a porous reservoir layer disposed between the second surface of the protective membrane architecture and the oxygen electrode, in contact with the oxygen electrode.

45. The battery cell of claim 44 wherein the porous reservoir layer is fully oxidized.

46. The battery cell of claim 45 wherein the fully oxidized porous reservoir layer is a metal oxide.

47. The battery cell of claim 46 wherein the reservoir layer is porous $ZrO_2$.

48. The battery cell of claim 1 wherein the deliverable capacity is greater than 10 mAh/cm$^2$.

49. The battery cell of claim 1 wherein the alkali metal anode is solid-state and non-flowing.

50. The battery cell of claim 1 wherein the alkali metal anode is selected from the group consisting of an alkali metal, an alkali metal intercalation material and an alkali metal alloy.

51. The battery cell of claim 1 wherein the alkali metal anode is a carbon alkali metal intercalation material.

52. The battery cell of claim 1 wherein the alkali metal anode is lithium metal.

53. The battery cell of claim 52 wherein a thickness of the lithium metal is greater than 100 um.

54. The battery cell of claim 52 wherein the alkali metal anode is lithium metal foil.

55. The battery cell of claim 54 wherein the lithium foil has a thickness greater than 100 um.

56. The battery cell of claim 1 wherein the first alkali metal anode-incompatible solvent is present in the catholyte to at least 5% by solvent volume.

57. The battery cell of claim 1 wherein the first alkali metal anode-incompatible solvent is present in the catholyte to at least 10% by solvent volume.

58. The battery cell of claim 1 wherein the first alkali metal anode-incompatible solvent is present in the catholyte to at least 20% by solvent volume.

59. The battery cell of claim 1 wherein the first alkali metal anode-incompatible solvent is an amide.

60. The battery cell of claim 59 wherein the first alkali metal anode-incompatible solvent is dimethylformamide.

61. The battery cell of claim 1 wherein the non-aqueous catholyte further comprises a second alkali metal anode incompatible, cathode performance enhancing, electrolyte solvent that is different from the first alkali metal anode-incompatible solvent, the second solvent selected from the group consisting of amides, amines, nitriles, organophosphorous solvents, organosulfur solvents, alcohols, diols and liquid polyols; and wherein the electrochemical reduction of molecular oxygen occurs on the surface or in the bulk of the oxygen electrode in contact with the non-aqueous catholyte and the electrochemical oxidation takes place at the anode without contact between the alkali metal anode and the second solvent.

62. The battery cell of claim 61 wherein the second solvent is a diol or liquid polyol.

63. The battery cell of claim 61 wherein the second solvent is ethylene glycol.

64. The battery cell of claim 61 wherein the second solvent is a nitrile.

65. The battery cell of claim 61 wherein the second solvent is acetonitrile.

66. The battery cell of claim 61 wherein the second solvent is an alcohol.

67. The battery cell of claim 61 wherein the second solvent is an amine.

68. The battery cell of claim 61 wherein the second solvent is an organophosphrous solvent or an organosulfur solvent.

69. The battery cell of claim 1 wherein the first alkali metal anode-incompatible solvent is characterizable as adversely reacting with and degrading the surface of the alkali metal anode material in contact with said anode material.

70. The battery cell of claim 69 wherein the first alkali metal anode-incompatible solvent is further characterizable as aggressively corroding the alkali metal anode material in contact with the anode material.

71. The battery cell of claim 69 wherein a concentration of HF in the catholyte is less than 10 ppm.

72. The battery cell of claim 1 wherein the catholyte further comprises an alkali metal cation salt.

73. The battery cell of claim 1 wherein the alkali metal cation salt does not react with moisture to form HF.

* * * * *